US010284558B2

(12) United States Patent
Owen et al.

(10) Patent No.: US 10,284,558 B2
(45) Date of Patent: May 7, 2019

(54) SYSTEMS AND METHODS FOR MANAGING PRIVACY SETTINGS OF SHARED CONTENT

(71) Applicant: Google LLC, Mountain View, CA (US)

(72) Inventors: Russell Owen, San Francisco, CA (US); Ivan Medvedev, Bellevue, WA (US); Garth Shoemaker, Sunnyvale, CA (US); Andrew Swerdlow, San Francisco, CA (US); Yevgeniy Eugene Shteyn, Cupertino, CA (US); Amanda Elwell Walker, Reston, VA (US)

(73) Assignee: Google LLC, Mountain View, CA (US)

( * ) Notice: Subject to any disclaimer, the term of this patent is extended or adjusted under 35 U.S.C. 154(b) by 565 days.

(21) Appl. No.: 14/824,873

(22) Filed: Aug. 12, 2015

(65) Prior Publication Data
US 2017/0048245 A1 Feb. 16, 2017

(51) Int. Cl.
G06F 17/30 (2006.01)
G06F 21/62 (2013.01)
H04L 29/06 (2006.01)
H04W 12/02 (2009.01)

(52) U.S. Cl.
CPC ........ H04L 63/10 (2013.01); G06F 17/30864 (2013.01); G06F 21/6227 (2013.01); G06F 21/6245 (2013.01); G06F 21/6272 (2013.01); H04L 63/0428 (2013.01); H04L 63/0471 (2013.01); H04L 63/061 (2013.01); H04W 12/02 (2013.01)

(58) Field of Classification Search
CPC . H04L 63/10; H04L 63/0428; G06F 21/6272; G06F 21/6227; H04W 12/02

USPC ......................................................... 713/168
See application file for complete search history.

(56) References Cited

U.S. PATENT DOCUMENTS

| 6,067,399 | A  | 5/2000  | Berger       |
| 6,895,111 | B1 | 5/2005  | Swift        |
| 6,959,099 | B2 | 10/2005 | Gutta et al. |
| 7,570,283 | B2 | 8/2009  | Sato et al.  |
| 8,098,904 | B2 | 1/2012  | Ioffe et al. |
| 8,126,190 | B2 | 2/2012  | Jung et al.  |
| 8,126,938 | B2 | 2/2012  | Cohen et al. |
| 8,203,609 | B2 | 6/2012  | Jung et al.  |

(Continued)

FOREIGN PATENT DOCUMENTS

WO 2014028009 A1 2/2014

OTHER PUBLICATIONS

International Search Report and Written Opinion for PCT App No. PCT/US2016/046720 dated Nov. 24, 2016, 23 pgs.

(Continued)

Primary Examiner — Harunur Rashid
Assistant Examiner — Angela R Holmes
(74) Attorney, Agent, or Firm — Honigman LLP

(57) ABSTRACT

Systems and methods for managing privacy settings of shared content include receiving content associated with an object; receiving privacy settings associated with the object associated with the received content; based on the received privacy settings, obfuscating, at least a portion of the content associated with the object to generated obfuscated content; and transmitting the obfuscated content to a publishing server, wherein the publishing server publishes the obfuscated content to one or more third parties.

66 Claims, 15 Drawing Sheets

(56) References Cited

U.S. PATENT DOCUMENTS

| | | | |
|---|---|---|---|
| 8,305,448 B2 | 11/2012 | Yoda | |
| 8,482,633 B2 | 7/2013 | Lee | |
| 8,570,403 B2 | 10/2013 | Lee et al. | |
| 8,744,143 B2 | 6/2014 | Chen | |
| 8,813,193 B2 | 8/2014 | Kim et al. | |
| 8,897,484 B1 | 11/2014 | Fredinburg et al. | |
| 8,923,647 B2 | 12/2014 | Kothari | |
| 8,925,107 B2 | 12/2014 | Dagaeff et al. | |
| 2006/0028558 A1* | 2/2006 | Sato | H04N 1/00281 348/211.99 |
| 2006/0285150 A1* | 12/2006 | Jung | H04N 1/00132 358/1.15 |
| 2009/0247193 A1 | 10/2009 | Kalavade | |
| 2011/0072037 A1 | 3/2011 | Lotzer | |
| 2011/0202968 A1 | 8/2011 | Nurmi | |
| 2012/0023332 A1* | 1/2012 | Gorodyansky | H04L 63/105 713/168 |
| 2013/0156331 A1 | 6/2013 | Kurabayashi et al. | |
| 2013/0289991 A1 | 10/2013 | Eshwar et al. | |
| 2014/0090074 A1 | 3/2014 | Bar-On et al. | |
| 2014/0176663 A1 | 6/2014 | Cutler et al. | |
| 2014/0196152 A1 | 7/2014 | Ur et al. | |
| 2014/0303991 A1 | 10/2014 | Frank | |
| 2014/0344362 A1 | 11/2014 | Ur | |

OTHER PUBLICATIONS

Chaudhry, M.U., et al., User Privacy Protection in Online Social Networks: Secure File Sharing on Facebook, Sci. Int. (Lahore), 27(2), 2015, pp. 1395-1401.

Marques, J., et al., Improving User Content Privacy on Social Networks Using Rights Management Systems, C. Ann. Telecommun., 2014, 69(1), p. 37-45.

Jeon, J., Touch Blur, downloaded Feb. 9, 2015, App Store on iTunes, 4 pgs.

Kirchner, D. Pixelot: Pixelate, Blur Photos, Andriod Apps on Google Play, downloaded Feb. 9, 2015, 5 pgs.

Metz, R., An Optical Trick Makes Disappearing Message Harder to Screenshot, MIT Technology Review, Oct. 8, 2014, 2 pgs.

Navarro, B. J., Newly Launched Yovo App Intends to Make "Privacy More Social", www.cnbc.com, Oct. 8, 2014, downloaded Feb. 9, 2015, 7 pgs.

Tootoonchian, A., et al., Lockr: Better Privacy for Social Networks, Proceedings of the 5th ACM International Conference on Emerging Networking Experiments and Technologies (CoNEXT), Dec. 1-4, 2009, 12 pgs.

Yovo App, https://yovo.me/, downloaded Feb. 9, 2015, 8 pgs.

* cited by examiner

SYSTEMS AND METHODS FOR MANAGING PRIVACY SETTINGS OF SHARED CONTENT

BACKGROUND

Field

The subject matter discussed herein relates generally to electronic sharing of content and more particularly to managing privacy settings associated with shared content.

Related Background

In the related art, online service providers may address privacy concerns via posted privacy policies and user terms of service. While such related art policies and terms of service may address usage of features and the functionality of a service, they fail to fully address user intent and expectations for unexpected usages of user content.

For example, a user A who takes a photo and posts the photo to a social networking website may understand his or her rights and responsibilities regarding further sharing and usage of the photo. However, a user B, whose image is positioned within another user's photo, or in a photo taken by the service provider itself, may not be aware of either the photo's initial posting by a user A, for example, or its treatment in subsequent use after posting.

With increased posting and sharing of online content, there is a need to enhance user privacy and content security to protect the content associated with users when positioned in media that may be posted by third-parties without the knowledge or consent of the subject user.

SUMMARY

Aspects of example implementations may relate to management of privacy settings associated with content being shared. In some example implementations, the content may be associated with an object and the privacy settings being managed may be associated with the object. Further, in some example implementations, the shared content may be obfuscated based on the privacy settings associated with the object. Once obfuscated, the shared content may be shared with third parties.

The subject matter includes methods for managing privacy of shared content, including receiving, by a computing device, content associated with an object; receiving, by the computing device, privacy settings associated with the object associated with the received content; based on the received privacy settings, obfuscating, by the computing device, at least a portion of the content associated with the object to generated obfuscated content; and transmitting, by the computing device, the obfuscated content to a publishing server, wherein the publishing server publishes the obfuscated content to one or more third parties.

The subject matter also includes methods for managing privacy of shared content, including receiving, by a computing device, content associated with an object; receiving, by the computing device, an object identification that identifies the object associated with the received content; determining, by the computing device, privacy settings associated with the identified object based on database stored on the computing device; based on the determined privacy settings, obfuscating, by the computing device, at least a portion of the content associated with the object to generated obfuscated content; and transmitting, by the computing device, the obfuscated content to a publishing server, wherein the publishing server publishes the obfuscated content to one or more third parties.

Further, the subject matter includes methods for managing privacy of shared content, including receiving, by a computing device, content associated with an object; extracting, by the computing device, object features from the content, the object features being associated with the object of the content; identifying, by the computing device, the object of the content based on the extracted object features; determining, by the computing device, privacy settings associated with the identified object based on a database stored on the computing device; based on the determined privacy settings, obfuscating, by the computing device, at least a portion of the content associated with the object to generated obfuscated content; and transmitting, by the computing device, the obfuscated content to a publishing server, wherein the publishing server publishes the obfuscated content to one or more third parties.

Additionally, the subject matter includes non-transitory computer readable media having stored therein computer executable instructions for receiving content associated with an object; receiving privacy settings associated with the object associated with the received content; based on the received privacy settings, obfuscating at least a portion of the content associated with the object to generated obfuscated content; and transmitting the obfuscated content to a publishing server, wherein the publishing server publishes the obfuscated content to one or more third parties.

The subject matter also includes non-transitory computer readable media having stored therein computer executable instructions for receiving content associated with an object; receiving an object identification that identifies the object associated with the received content; determining privacy settings associated with the identified object based on database stored on the computing device; based on the determined privacy settings, obfuscating at least a portion of the content associated with the object to generated obfuscated content; and transmitting the obfuscated content to a publishing server, wherein the publishing server publishes the obfuscated content to one or more third parties.

Further, the subject matter includes non-transitory computer readable media having stored therein computer executable instructions for receiving content associated with an object; extracting object features from the content, the object features being associated with the object of the content; identifying the object of the content based on the extracted object features; determining privacy settings associated with the identified object based on a database stored on the computing device; based on the determined privacy settings, obfuscating at least a portion of the content associated with the object to generated obfuscated content; and transmitting the obfuscated content to a publishing server, wherein the publishing server publishes the obfuscated content to one or more third parties.

Additionally, the subject matter includes at least one computing device comprising storage and a processor configured to perform receiving content associated with an object; receiving privacy settings associated with the object associated with the received content; based on the received privacy settings, obfuscating at least a portion of the content associated with the object to generated obfuscated content; and transmitting the obfuscated content to a publishing server, wherein the publishing server publishes the obfuscated content to one or more third parties.

The subject matter also includes at least one computing device comprising storage and a processor configured to perform receiving content associated with an object; receiving an object identification that identifies the object associated with the received content; determining privacy settings associated with the identified object based on database stored on the computing device; based on the determined privacy settings, obfuscating at least a portion of the content associated with the object to generated obfuscated content; and transmitting the obfuscated content to a publishing server, wherein the publishing server publishes the obfuscated content to one or more third parties.

Further, the subject matter includes at least one computing device comprising storage and a processor configured to perform receiving content associated with an object; extracting object features from the content, the object features being associated with the object of the content; identifying the object of the content based on the extracted object features; determining privacy settings associated with the identified object based on a database stored on the computing device; based on the determined privacy settings, obfuscating at least a portion of the content associated with the object to generated obfuscated content; and transmitting the obfuscated content to a publishing server, wherein the publishing server publishes the obfuscated content to one or more third parties.

Additionally, the subject matter includes methods for managing privacy of shared content, including receiving, by a computing device, previously received content associated with an object; receiving, by the computing device, privacy settings associated with the object associated with the received content; based on the received privacy settings, obfuscating, by the computing device, at least a portion of the content associated with the object to generated obfuscated content; and publishing, by the computing device, the obfuscated content to one or more third parties.

The subject matter also includes methods for managing privacy of shared content, including receiving, by a computing device, previously received content associated with an object; receiving, by the computing device, an object identification identifying the object associated with the received content; determining, by the computing device, privacy settings associated with the identified object based on database stored on the computing device; based on the determined privacy settings, obfuscating, by the computing device, at least a portion of the content associated with the object to generated obfuscated content; and publishing, by the computing device, the obfuscated content to one or more third parties.

Further, the subject matter includes methods for managing privacy of shared content, including receiving, by a computing device, previously received content associated with an object; extracting, by the computing device, object features from the content, the object features being associated with the object of the content; identifying, by the computing device, the object of the content based on the extracted object features; determining, by the computing device, privacy settings associated with the identified object based on a database stored on the computing device; based on the determined privacy settings, obfuscating, by the computing device, at least a portion of the content associated with the object to generated obfuscated content; and publishing, by the computing device, the obfuscated content to one or more third parties.

Additionally, the subject matter includes non-transitory computer readable media having stored therein computer executable instructions for receiving previously received content associated with an object; receiving privacy settings associated with the object associated with the received content; based on the received privacy settings, obfuscating at least a portion of the content associated with the object to generated obfuscated content; and publishing the obfuscated content to one or more third parties.

The subject matter also includes non-transitory computer readable media having stored therein computer executable instructions for receiving previously received content associated with an object; receiving an object identification identifying the object associated with the received content; determining privacy settings associated with the identified object based on a database; based on the determined privacy settings, obfuscating at least a portion of the content associated with the object to generated obfuscated content; and publishing the obfuscated content to one or more third parties.

Further, the subject matter includes non-transitory computer readable media having stored therein computer executable instructions for receiving previously received content associated with an object; extracting object features from the content, the object features being associated with the object of the content; identifying the object of the content based on the extracted object features; determining privacy settings associated with the identified object based on a database; based on the determined privacy settings, obfuscating at least a portion of the content associated with the object to generated obfuscated content; and publishing the obfuscated content to one or more third parties.

Additionally, the subject matter includes at least one computing device comprising storage and a processor configured to perform receiving previously received content associated with an object; receiving privacy settings associated with the object associated with the received content; based on the received privacy settings, obfuscating at least a portion of the content associated with the object to generated obfuscated content; and publishing the obfuscated content to one or more third parties.

The subject matter also includes at least one computing device comprising storage and a processor configured to perform receiving previously received content associated with an object; receiving an object identification identifying the object associated with the received content; determining privacy settings associated with the identified object based on database stored on the computing device; based on the determined privacy settings, obfuscating at least a portion of the content associated with the object to generated obfuscated content; and publishing the obfuscated content to one or more third parties.

Further, the subject matter includes at least one computing device comprising storage and a processor configured to perform receiving previously received content associated with an object; extracting object features from the content, the object features being associated with the object of the content; identifying the object of the content based on the extracted object features; determining privacy settings associated with the identified object based on a database; based on the determined privacy settings, obfuscating at least a portion of the content associated with the object to generated obfuscated content; and publishing the obfuscated content to one or more third parties.

Additionally, the subject matter includes methods for distributing received content, including receiving, by a computing device, received content associated with an object; partitioning, by the computing device, the received content into a plurality of layers, the plurality of layers having two or more levels of fidelity; generating, by a computing device, an encryption key; encrypting, by a computing device, at least one of the plurality of layers using the generated encryption key; combining, by a computing device, the encrypted at least one plurality of layers with a remainder of the plurality of layers to generate the obfuscated content; and transmitting, by the computing device, the obfuscated content to a publishing server for publishing to one or more third parties.

The subject matter also includes methods for distributing received content, including receiving, by a computing device, received content associated with an object; partitioning, by the computing device, the received content into a plurality of layers, the plurality of layers having two or more levels of fidelity; generating, by a computing device, an encryption key; encrypting, by a computing device, at least one of the plurality of layers using the generated encryption key; combining, by a computing device, the encrypted at least one plurality of layers with a remainder of the plurality of layers to generate the obfuscated content; and publishing, by the computing device, the obfuscated content to one or more third parties.

Further, the subject matter includes non-transitory computer readable media having stored therein computer executable instructions for receiving received content associated with an object; partitioning the received content into a plurality of layers, the plurality of layers having two or more levels of fidelity; generating an encryption key; encrypting at least one of the plurality of layers using the generated encryption key; combining the encrypted at least one plurality of layers with a remainder of the plurality of layers to generate the obfuscated content; and transmitting the obfuscated content to a publishing server for publishing to one or more third parties.

Additionally, the subject matter includes non-transitory computer readable media having stored therein computer executable instructions for receiving received content associated with an object; partitioning the received content into a plurality of layers, the plurality of layers having two or more levels of fidelity; generating an encryption key; encrypting at least one of the plurality of layers using the generated encryption key; combining the encrypted at least one plurality of layers with a remainder of the plurality of layers to generate the obfuscated content; and publishing the obfuscated content to one or more third parties.

The subject matter also includes at least one computing device comprising storage and a processor configured to perform receiving received content associated with an object; partitioning the received content into a plurality of layers, the plurality of layers having two or more levels of fidelity; generating an encryption key; encrypting at least one of the plurality of layers using the generated encryption key; combining the encrypted at least one plurality of layers with a remainder of the plurality of layers to generate the obfuscated content; and transmitting the obfuscated content to a publishing server for publishing to one or more third parties.

Further, the subject matter includes at least one computing device comprising storage and a processor configured to perform receiving received content associated with an object; partitioning the received content into a plurality of layers, the plurality of layers having two or more levels of fidelity; generating an encryption key; encrypting at least one of the plurality of layers using the generated encryption key; combining the encrypted at least one plurality of layers with a remainder of the plurality of layers to generate the obfuscated content; and publishing the obfuscated content to one or more third parties.

Additionally, the subject matter includes systems for managing privacy of shared content, including a terminal device having a content receiving device configured to receive content; a storage configured to store content by the content receiving device; a privacy setting determiner configured to determine privacy settings associated with an object of the received content that is associated with a user of an online account that is not associated with the terminal device; a content obfuscator configured to obfuscate at least a portion of the received content based on the privacy settings of the object associated with the received content to generate obfuscated content; and a transmitter configured to transmit the obfuscated content; and a server device including a receiver configured to receive the obfuscated content from the transmitter of the terminal device; a publisher configured to publish the obfuscated content to one or more third parties, wherein the receiver is configured to receive a request to change privacy settings of the object of the received content; and a de-obfuscator configured to, based on the received request to change privacy settings, de-obfuscate the at least a portion of the received content to generate de-obfuscated content, wherein the publisher is configured to publish the de-obfuscated content to one or more third parties based on the received request to change privacy settings.

The subject matter also includes systems for managing privacy of shared content, including a terminal device, the terminal device having a content receiver configured to receive content; a storage configure to store received content; and a transmitter configured to transmit the received content; and a server, including a receiver configured to receive the received content transmitted from the transmitter of the terminal device; a privacy setting determiner configured to determine privacy settings of an object of the received content; a content obfuscator configured to obfuscate at least a portion of the received content based on the privacy settings of the object of the received content to generate obfuscated content; a publisher configured to publish the obfuscated content to one or more third parties, wherein the receiver is configured to receive a request to change privacy settings of the object of the received content; and a de-obfuscator configured to, based on the received request to change privacy settings, de-obfuscate the at least a portion of the received content to generate de-obfuscated content, wherein the publisher is configured to, based on the received request to change privacy settings, publish the de-obfuscated content to one or more third parties.

The methods are implemented using one or more computing devices and/or systems. The methods may be stored in computer-readable media.

DETAILED DESCRIPTION

Figure 1:
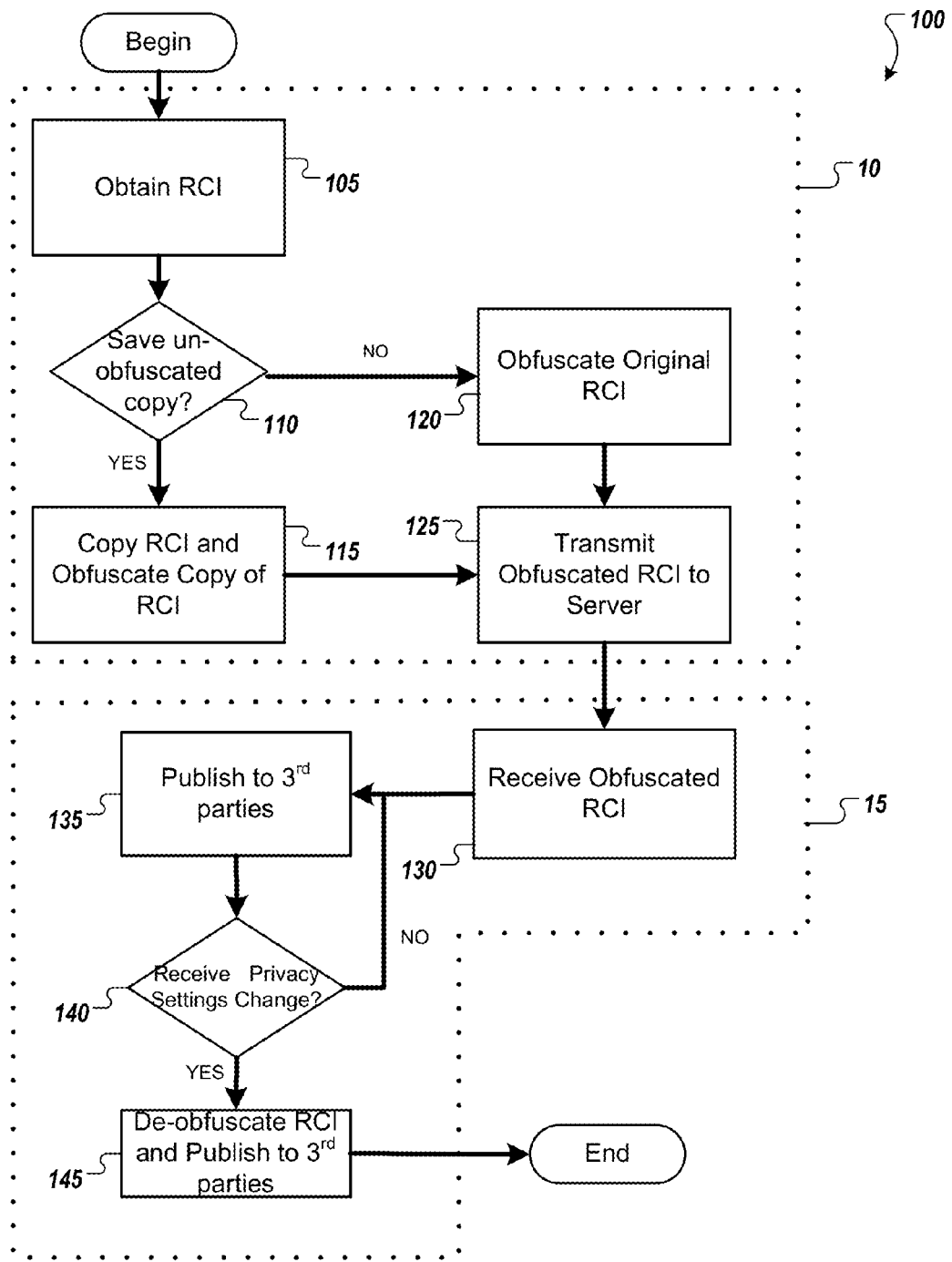
FIG. 1 shows a content publication process for a content item according to an example implementation.

The subject matter described herein is taught by way of example implementations. Various details have been omitted for the sake of clarity and to avoid obscuring the subject matter. The examples shown below are directed to structures and functions for implementing systems and methods for managing privacy settings of shared content.

The example implementations relate to electronic sharing of content and more particularly to managing privacy settings associated with shared content. For example, a terminal device may receive (e.g., obtain) content associated with an object, and receive privacy settings associated with the object that is associated with the received content. With respect to the discussion of the foregoing example implementations, the terminal device may include, but is not limited to a distributed network of personal devices, communicatively coupled by a personal area network (PAN), or a combination of personal and public devices that are communicatively coupled, for example but not by of limitation, by the PAN. Further, the terminal device may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment).

Based on the received privacy settings, at least a portion of the content that is associated with the object may be obfuscated, so as to generate obfuscated content. The obfuscated content may be published to one or more third parties. Accordingly, the published or shared content may obfuscate the object on a complete (e.g., all recipients) or partial (e.g., recipients, based on social graph or the like) basis.

The obfuscation may occur at the terminal device or at the server device. Similar, the privacy settings may be set at the terminal device, the server device, or a third party device, as explained in further detail below. For the case where a third party device is involved, the third party device may be co-located with the terminal device that is obtaining the content. In some example implementations, the obtained content may be obfuscated at the terminal device, and subsequently, some content may be de-obfuscated at the terminal device or the server device, based on an identify of an object in the content (e.g., a person identified in a photo). Further, a request may be made to change the privacy settings, so as to cause the terminal device or the server device to keep the content obfuscated or de-obfuscate the content.

As used herein, "privacy settings" may refer to user-defined rules or preferences, as determined by the owner of a device and/or the owner of an account associated with the device. For example, but not by way of limitation, the privacy settings may be defined by a user of a terminal device, a user of a server device, a user of a third party device (discussed in greater detail below), a user of a social media account hosted on the server device or any other user that may be apparent to a person of ordinary skill in the art. Additionally, privacy settings associated with a content item may include user-defined rules or preferences as defined by a user who is the subject of content item even if the user is not using the terminal device that is obtaining the content item (e.g., a user who appears in an image obtained by another terminal device), and even if the user is not aware the content item is being obtained by another terminal device.

More specifically, the user may define the privacy settings to specify how content may be stored, shared, published, obfuscated, or otherwise handled based on one or more aspects associated with the content at the time that the content item is obtained. For example, the user may define the privacy settings to specify the manner in which the content may be stored, shared, published, obfuscated, or otherwise handled, based on a time that the content item is (or was) obtained, a physical location where the content item is (or was) obtained, attributes of the physical location (e.g., environment) where the content item was obtained, context-based information such as the subject matter of the content item, or other aspects associated with the obtaining of the content item. For example, but not by way of limitation, and as further disclosed below, the privacy settings may be directed to an individual account privacy setting, or privacy settings associated with a social graph (e.g., group or social circle associated with the individual account).

Further, the user may define the privacy settings (e.g., to specify how content may be stored, shared, published, obfuscated, or otherwise handled) based on one or more aspects associated with the content that occur after the content item has been obtained. For example, these aspects may include (but are not limited to) on an intended location of sharing or publication of the content (e.g., website, webpage, web stream), a time elapsed since the content was obtained; a time elapsed since the content was last shared or published, a time elapsed since the content was previously obfuscated (or de-obfuscated), or any aspects that may occur after the content item has been obtained.

The privacy settings may be stored on the terminal device, the server device, a third party device (discussed in greater detail below) or other location. Privacy settings may be associated with the content item when the content item is obtained, or after the content item has been obtained. The privacy settings associated with the content item may be updated or modified after the content item has been received, stored, shared, published, obfuscated, or de-obfuscated, for example.

Example Implementation: Obfuscation at Terminal Device

FIG. 1 shows a content publication process 100 for a content item according to an example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). However, the present inventive concept is not limited thereto, and other example implementations of RCI may be substituted therefor as would be understood by those skilled in the art.

In this example implementation, the publication process 100 involves the exchange of information between a terminal device 10 and a server device 15. However, example implementations are not limited thereto, and may further involve the exchange of information between multiple terminal devices 10, multiple server devices 15, any combination of terminal devices 10 and server devices 15, or no exchange of information (e.g., the process may be performed on a single terminal device 10 or a single server device 15).

An example implementation of a terminal device 10 used in the content publication process 100 may be a mobile device, such as a phone, a music player, a digital camera, a tablet, a person computing device, or any other mobile device that would be apparent to a person of ordinary skill in the art. As noted above, the terminal device may include a network of personal components or devices (e.g., PAN) and/or mobile devices. The terminal device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 100 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service that may be apparent to a person of ordinary skill in the art. An example implementation of a server device 15 is described in greater detail below with respect to FIG. 13.

In this example implementation of the content publishing process 100, the terminal device 10 obtains a content item at 105. The content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, including but not limited to a peripheral device, such as a camera or microphone, connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

Once the content item is obtained by the terminal device 10, the terminal device 10 determines whether an unobfuscated copy of the content item is to be saved or the content item should be obfuscated in real-time at 110. The determination at 110 is based on privacy settings associated with the content item. In some example implementations, the privacy settings used may be associated with settings stored on the terminal device 10, or the privacy settings may be received by the terminal device 10 before, at the time of, or after the obtaining of the content item.

If the terminal device 10 determines that an unobfuscated copy of the content item should be saved at 110 (YES), the original obtained content item is stored to storage in an un-obfuscated format and a copy of the original obtained content item is created, obfuscated, and stored to the storage at 115 to generate obfuscated content. For this example implementation as well as the other example implementations disclosed below, it should be noted that the content item can include a plurality of content items (e.g., fragments of content items). For example, but not by way of limitation, the fragments of content items may be positioned together (e.g., sequentially) or at different locations (e.g., separated). The example implementations herein may include a process for re-assembling the fragments of the content item. The process may be executed by use of instructions stored in a computer-readable medium (e.g., a software script or computer-implemented algorithm).

When the content item is obfuscated, at least of a portion of the content is obfuscated so as to render the portion of the content un-accessible (e.g., incapable of being viewed, heard, or in any other way received and comprehended by a third party). In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Example obfuscation processes are discussed in greater detail below with respect to FIG. 10.

Conversely, if the terminal device 10 determines that an unobfuscated copy of the content item should not be saved at 110 (NO), the originally obtained content item is obfuscated at 120 prior to being stored on the terminal device 10 so as to generate obfuscated content. Accordingly, only an obfuscated copy is stored, and no unobfuscated copy is stored. When the content item is obfuscated, at least of a portion of the content is obfuscated to render the portion of the content un-accessible (e.g., incapable of being viewed, heard, or in any other way received and comprehended by a third party). In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

After the obfuscated content is generated in 115 or 120, the obfuscated content is transmitted from the terminal device 10 to the server device 15 at 125 and is received by the server device 15 at 130. The unobfuscated content is not received by the server device 15 at 125. The transmission and reception of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism as would be understood by a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the obfuscated content may be a direct (device-to-device) transmission, or it may go through one or more intermediate devices, or it may be through a device network as may be apparent to a person of ordinary skill in the art.

Once the obfuscated content and/or specification (e.g., script or code) is received by the service device 15 in 130, the server device 15 publishes the obfuscated content to one or more third-parties at 135. The publication in 135 may be based on privacy settings associated with the obfuscated content item. In some example implementations, the privacy settings used may come from settings stored on the server device 15 or the privacy settings may be received by the server device 15 before, at the time of, or after receiving the obfuscated content item.

At 135, the server device 15 may publish the obfuscated content to third-parties by directly sending the obfuscated content item to the one or more third-parties. For example, the server device 15 may send the obfuscated content item to the one or more third-parties by email, instant message, file-transfer-protocol (FTP), public or private online social network interaction application, or any other known party-to-party transfer mechanism, based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, at 140 the server terminal 15 determines if any requests to update or change the privacy settings associated with the obfuscated content item have been received. A request to change the privacy settings may be received by the server device 15 from the terminal device 10, another server device, or any other computing device that may be apparent to a person of ordinary skill in the art. If the server device 15 determines that no update request has been received at 140 (NO), the server device 15 continues to publish the obfuscated content to the one or more third-parties.

Conversely, if the server device 15 determines that an update request has been received at 140 (YES), the server device 15 performs a de-obfuscation process at 145 to produce a de-obfuscated content item. The de-obfuscation process may include reversing any blurring, scrambling, overwriting, removing or any other obfuscation performed by the terminal device in 115 or 120 to de-obfuscate a portion of the content item or the entire content item. De-obfuscation processes are discussed in greater detail below with respect to FIG. 11. At 145, the server device 15 may also publish the de-obfuscated content that includes content item, and/or specification or algorithm (e.g., software code embedded as executable instructions in a non-transitory computer-readable medium), to one or more third-parties.

As with the publication to third-parties at 135 discussed above, the server device 15 may publish the de-obfuscated content to third-parties in 145 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), on the privacy settings.

In some examples, process 100 may be implemented with different, fewer, or more blocks. Process 100 may be implemented as computer executable instructions, which can be stored on a medium, loaded onto one or more processors of one or more computing devices, and executed as a computer-implemented method.

Example Implementation: Obfuscation at Server Device

Figure 2:
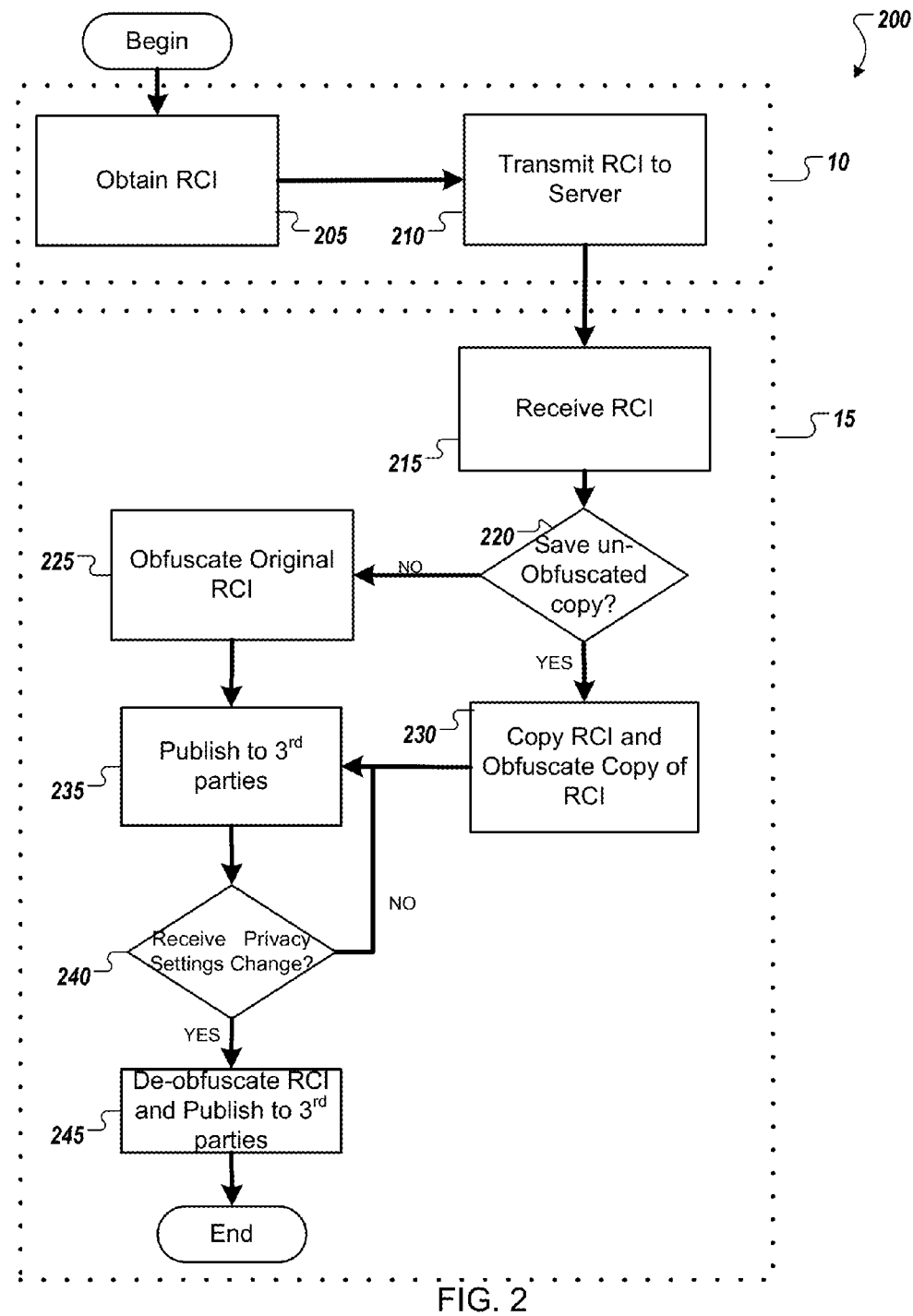
FIG. 2 shows a content publication process for a content item according to another example implementation.

FIG. 2 shows another content publication process 200 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 200 may be similar to aspects of the content publication process 100 discussed above.

In this example implementation, the publication process 200 involves the exchange of information between a terminal device 10 and a server device 15. However, example implementations may involve the exchange of information between multiple terminal devices 10, multiple server devices 15, any combination of terminal devices 10 and server devices 15, or no exchange of information (e.g., the process may be performed on a single terminal device 10 or a single server device 15).

An example implementation of a terminal device 10 used in the content publication process 200 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 200 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service that may be apparent to a person of ordinary skill in the art. An example implementation of a server device 15 is described in greater detail below with respect to FIG. 13.

In this example implementation of the content publishing process 200, the terminal device 10 obtains a content item at 205. A content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

After the content item is obtained by the terminal device in 205, the content item is transmitted from the terminal device 10 to the server device 15 at 210 and is received by the server device 15 at 215. The transmission and reception of the content item is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism known to those of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the content may be a direct (device-to-device) transmission, or it may go through one or more intermediate devices, or it may be through a device network as may be apparent to a person of ordinary skill in the art.

Once the content is received in 215, the server device 15 determines whether an unobfuscated copy of the content item is to be saved or the content item should be obfuscated in real-time at 220. The determination in 220 is based on privacy settings associated with the content item. In some example implementations, the privacy settings used may come from settings stored on the server device 15 or the privacy settings may be received by the server device 15 before, at the time of, or after receiving the content item.

If the server device 15 determines that an unobfuscated copy of the content item should be saved in real-time at 220 (YES), the originally obtained content item is stored to storage in an un-obfuscated format and a copy of the obtained content is created, obfuscated, and stored to the storage at 230 to generate obfuscated content. Accordingly, only an obfuscated copy is stored, and there is no unobfuscated copy that is stored. When the content item is obfuscated, at least a portion of the content is obfuscated to render the portion of the content un-accessible (e.g., incapable of being viewed, heard, or in any other way received and comprehended by a third party). In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof, may be obfuscated. Further, all or part of the content item, such as the metadata, content specification, or script, may be used to generate a meta-level description, which can in turn be used to potentially facilitate subsequent determinations to share, transfer, render, and/or publish the content item. Example obfuscation processes are discussed in greater detail below with respect to FIG. 10.

Conversely, if the server device 15 determines that an unobfuscated copy of the content item should not be saved at 220 (NO), the originally obtained content item is obfuscated at 225 prior to being stored on the server device 15 to generate obfuscated content. Accordingly, only an obfuscated copy is stored, and there is no unobfuscated copy that is stored. When the content item is obfuscated, at least of a portion of the content is obfuscated to render the portion of the content un-accessible (e.g., incapable of being viewed, heard, or in any other way received and comprehended by a third party). In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Example obfuscation processes are discussed in greater detail below with respect to FIG. 10.

After the obfuscated content is generated in 225 or 230, the server device 15 publishes the obfuscated content to one or more third-parties at 235, without publishing the unobfuscated content if a copy thereof was made at 230. The publication in 235 may be done based on privacy settings associated with the obfuscated content item. In some example implementations, the privacy settings used may come from settings stored on the server device 15 or the privacy settings may be received by the server device 15 before, at the time of, or after receiving the content item.

At 235, the server device 15 may publish the obfuscated content to third-parties by directly sending the obfuscated content item to the one or more third-parties. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 240. A request to change the privacy settings may be received by the server device 15 from the terminal device 10, another server device, or any other computing device that may be apparent to a person of ordinary skill in the art. If the server device 15 determines that no update request has been received at 240 (NO), the server device 15 continues to publish the obfuscated content to the one or more third-parties.

Conversely, if the server device 15 determines that an update request has been received at 240 (YES), the server device 15 performs a de-obfuscation process at 245 to produce a de-obfuscated content item. The de-obfuscation process may include reversing any blurring, scrambling, overwriting, removing or any other obfuscation performed by the terminal device in 225 or 230 to de-obfuscate a portion of the content item or the entire content item. De-obfuscation processes are discussed in greater detail below with respect to FIG. 11. At 245, the server device 15 may also publish the de-obfuscated content the de-obfuscated content that includes the content item, and/or specification or algorithm (e.g., software code embedded as executable instructions in a non-transitory computer-readable medium), to one or more third-parties.

As with the publication to third-parties at 235 discussed above, the server device 15 may publish the de-obfuscated content to third-parties in 245 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 200 may be implemented with different, fewer, or more blocks. Process 200 may be implemented as computer executable instructions, which can be stored on a medium, loaded onto one or more processors of one or more computing devices, and executed as a computer-implemented method.

Example Implementation: Setting Determination at Terminal Device

Figure 3:
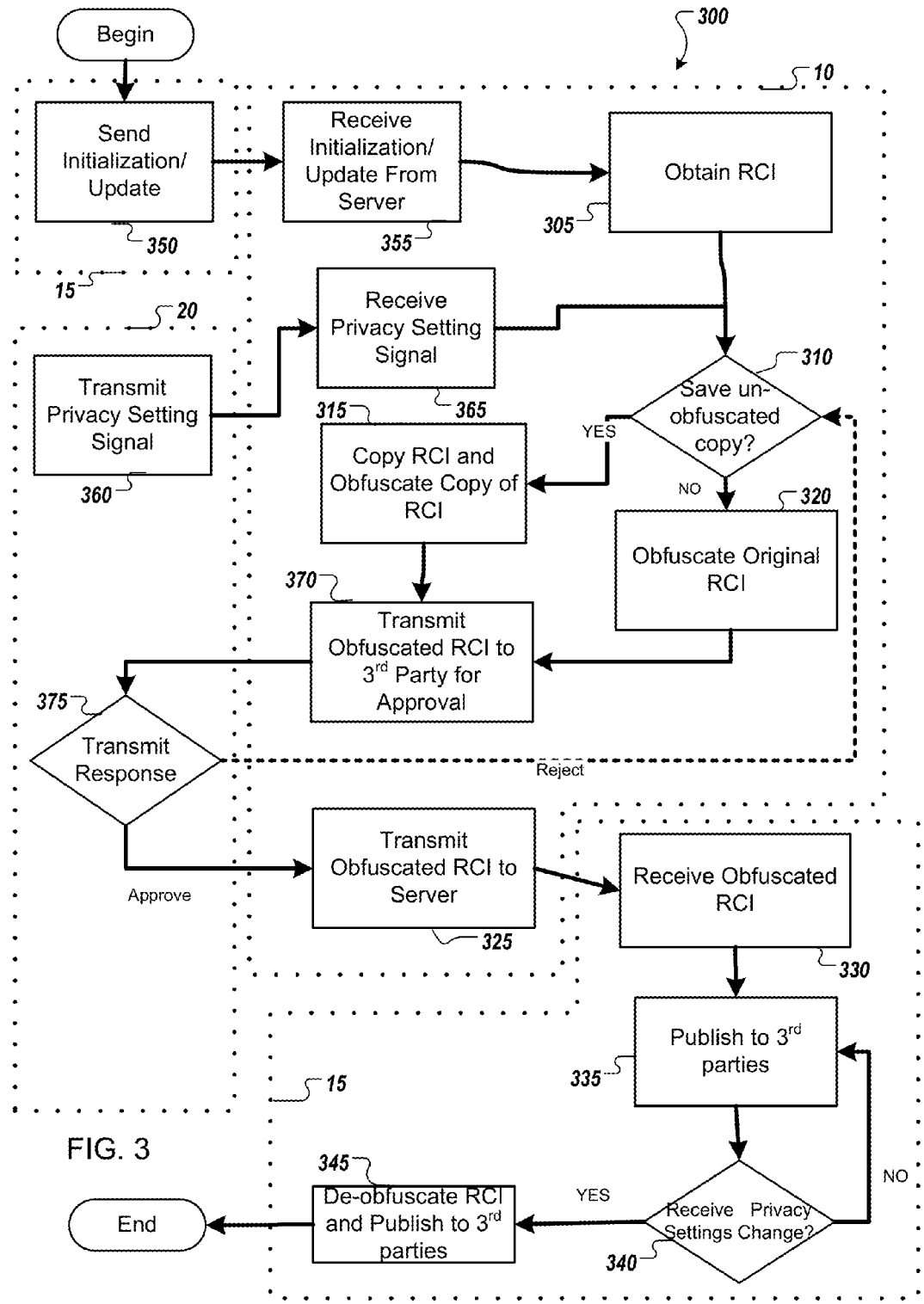
FIG. 3 shows a content publication process for a content item according to another example implementation.

FIG. 3 shows another content publication process 300 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 300 may be similar to aspects of the content publication process 100 discussed above and may use similar reference numerals. In this example implementation, the publication process 300 involves the exchange of information between a terminal device 10, a server device 15 and a third-party device 20. However, example implementations may involve the exchange of information between multiple terminal devices 10, multiple server devices 15, multiple third-party devices 20, any combination of terminal devices 10, server devices 15, and third-party devices 20 or no exchange of information (e.g., the process may be performed on a single terminal device 10, a single server device 15, or a single third-party device 20).

An example implementation of a terminal device 10 used in the content publication process 300 may be a mobile device, such as a phone, a music player, a digital camera, a tablet, a person computing device, or any other mobile device that may be apparent to a person of ordinary skill in the art. As noted above, the terminal device may include a network of personal components or devices (e.g., PAN) and/or mobile devices. The terminal device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 300 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service apparent to a person of ordinary skill in the art. An example implementation of a server device 15 is described in greater detail below with respect to FIG. 13.

Figure 12:
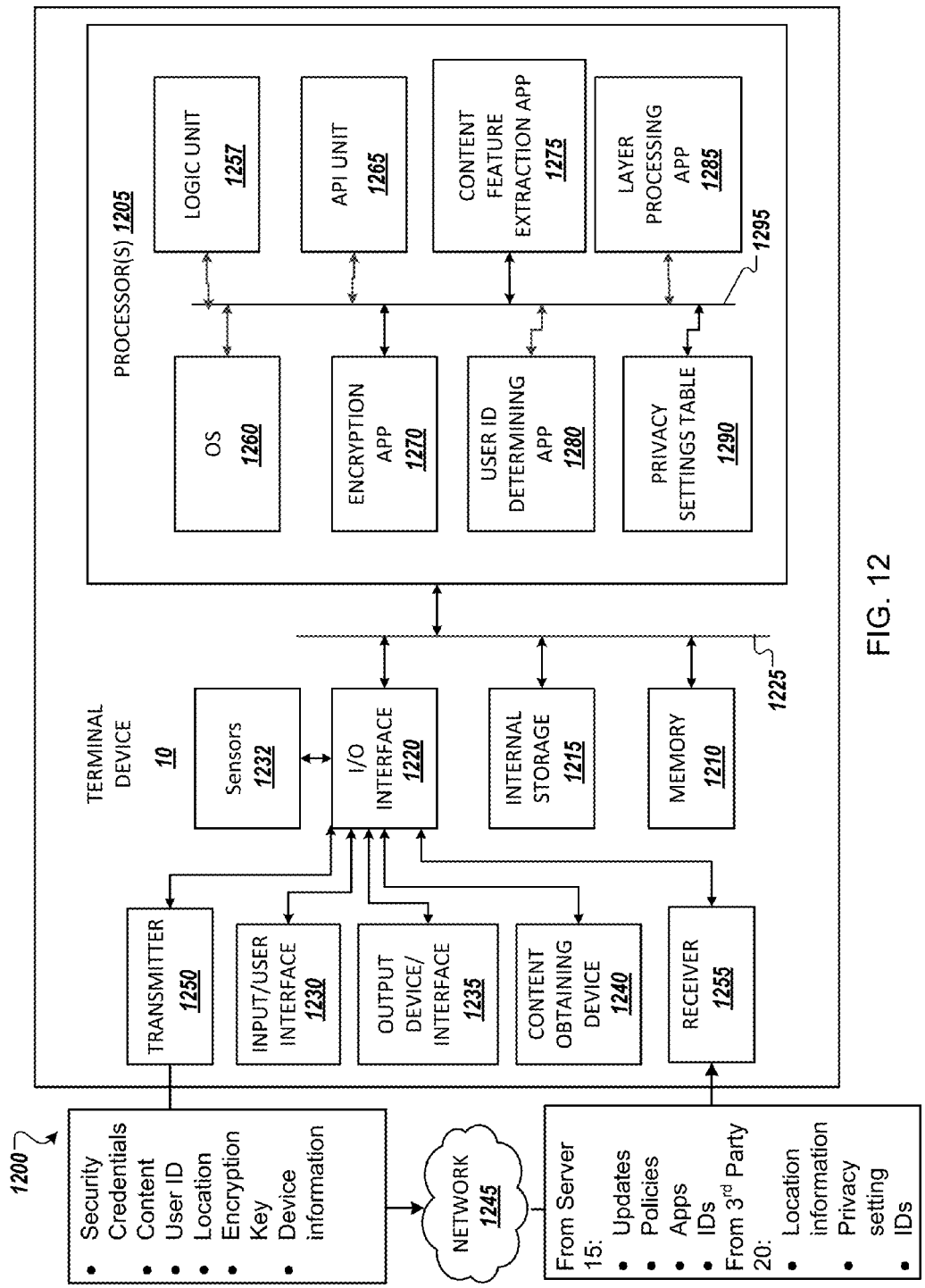
FIG. 12 shows a terminal device according to an example implementation.
Figure 13:
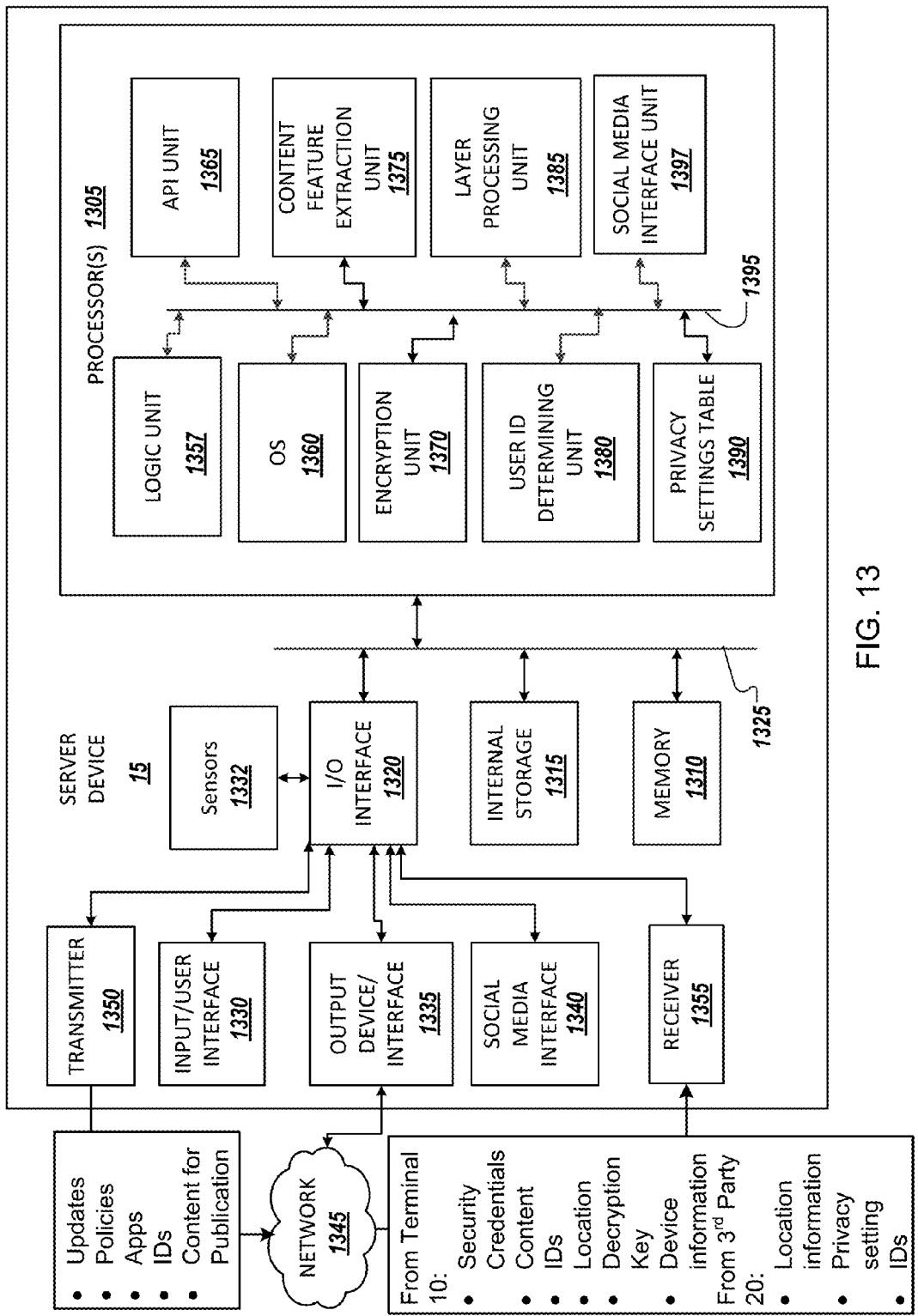
FIG. 13 shows a server device according to an example implementation.

An example implementation of a third-party device 20 may be any computing device that may be apparent to a person of ordinary skill in the art, and may have components similar to those of the terminal device 10 shown in FIG. 12 or the server device 15 shown in FIG. 13. In some example implementations, the third-party device 20 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment).

Further, in some example implementations, the third-party device 20 may be one or more servers, personal computers, mainframes, blades or other computing devices. In some example implementations, a computing device may be considered a third-party device 20 if it is a separate device from both the terminal device 10 and the server device 15. However, in some example implementations of the process 300, the server device 15 may function as both the third-party device 20 and the server device 15.

In some example implementations, the third party device 20 may be a mobile device that is co-located at substantially the same location as the terminal device 10 at the time of obtaining of one or more content items as discussed in greater detail below.

In some example implementations of the content publishing process 300, the server device 15 sends an initialization and/or update signal to the terminal device 10 at 350. The terminal device 10 receives the initialization and/or update signal from the server device 15 at 355. The transmission and reception of the initialization and/or update signal is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the initialization and/or update signal may be a direct (device-to-device) transmission, or it may go through one or more intermediate devices, or it may be through a device network as may be apparent to a person of ordinary skill in the art.

After the terminal device 10 receives the initialization and/or update signal at 355, the terminal device 10 may obtain a content item in 305. The content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, including a peripheral device such as a camera or microphone, connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

Though the process 300 illustrated in FIG. 3 includes the transmission and reception of the initialization and/or update signal, example implementations of the process may not include the transmission and reception of the initialization and/or update signal. In such example implementations, the process 300 may begin with the obtaining of the content item by the terminal device 10 in 305.

During the obtaining of the content item at 305, the third party device 20 may transmit a privacy setting signal at 360. In some example implementations, the privacy setting signal sent in 360 may include one or more privacy settings associated with a user of the third party device 20, which may be different from a user of the terminal device 10. For example, the privacy setting signal may indicate a user's preferences for obtaining, obfuscating, and/or publication of the user's image, voice, name, or any other identifying features that may be apparent to a person of ordinary skill in the art. In some example implementations, the privacy setting signal may include feature information associated with the user of the third party device. The feature information may also be information that can be used to identify the user of the third party device in the content item obtained by the terminal device. For example, the feature information may be facial features, biometric information, vocal patterns, or any other identifiable feature information. The feature information may also include person information identifying the user such as name, address, phone number, email address, user name, etc. The feature information may also include device information identifying the third-party device such as device identification code or identifying information, device model, or device location. Further, the feature information may include, but is not limited to, data that may be sensed (e.g., by a sensor or other sensing device), such as location, velocity, lighting condition, or other environmental features as would be understood by those skilled in the art.

After the privacy setting signal is transmitted from the third party device 20 to the terminal device 10 at 360, the terminal device 10 receives the privacy setting signal at 365. The privacy setting signal may be implemented as an identifier for obtaining a personal or shared privacy (e.g., group) settings. Optionally, the privacy setting signal or its components may be obfuscated. The transmission and reception of the privacy setting signal in 360 and 365 is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the privacy setting signal may be a direct (device-to-device) transmission, or may go through one or more intermediate devices, or may be through a device network as may be apparent to a person of ordinary skill in the art.

Once the privacy setting signal is received by the terminal device 10, the terminal device 10 determines whether an unobfuscated copy of the content item should be saved or the content item should be obfuscated in real-time at 310. The determination in 310 is made based on privacy settings associated with the content item as well as the privacy setting signal received from the third party device. In some example implementations, the privacy settings associated with the content item used may be associated with settings stored on the terminal device 10, or the privacy settings may be received by the terminal device 10 before, at the time of, or after obtaining the content item.

If the terminal device 10 determines that an unobfuscated copy of the content item should be saved at 310 (YES), the originally obtained content item is stored to storage in an un-obfuscated format and a copy of the obtained content is created, obfuscated, and stored to the storage at 315 to generate obfuscated content. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy setting signal received from the third-party device 20. For example, the feature information received with the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

Conversely, if the terminal device 10 determines that an unobfuscated copy of the content item should be not be saved at 310 (NO), the originally obtained content item is obfuscated at 320 prior to being stored on the terminal device 10 to generate obfuscated content. Accordingly, only an obfuscated copy is stored, and no unobfuscated copy is stored. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy setting signal received from the third-party device 20. For example, the feature information received with the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

After the obfuscated content is generated at 315 or 320, the obfuscated content is transmitted from the terminal device 10 to the third-party device 20 at 370 for review and approval. The transmission of the obfuscated content to the third-party device 20 is based on the privacy setting signal received at 365. The transmission of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission may also include wireline transmission mechanisms such as a LAN connection, a serial connection, a fiber-optic connection, a USB connection, or any other known connection mechanism. As noted above, the transmission and reception may also occur within a PAN. The transmission and reception of the obfuscated content may be a direct (device-to-device) transmission, or it may go through one or more intermediate devices, or it may be through a device network as may be apparent to a person of ordinary skill in the art.

After the obfuscated content is transmitted to the third-party device 20, the third-party device 20 transmits a response either rejecting or approving the obfuscated content at 375. In some example implementations, the response may be based on an input received from a user via a user interface device, such as a button, switch, knob, screen press, audio input device (e.g., microphone configured to receive a voice input), a kinetic user input (e.g., motion-aware or touch-aware device configured to sense a user gesture, such as a camera, radar, wearable sensor including in apparel such as clothing, jewelry, glasses, etc.), or other user interface device that may be apparent to a person of ordinary skill in the art. In other example implementations, the response may be based on a comparison of the obfuscated content with the privacy settings stored on the third party device.

If the response transmitted by the third-party device 20 indicates that the obfuscated content is approved, the process 300 proceeds to 325 discussed below. Conversely, if the response transmitted by the third-party device 20 indicates that the obfuscated content is rejected, the process 300 may optionally (as indicated by the broken line) return to 310 and repeat 310, 315, 320 and 370 to re-obfuscate the obtained content item one or more times in some example implementations. In other example implementations, the process 300 may simply terminate without returning to 310 if the response indicates the obfuscated content is rejected.

After the response indicative of approval is transmitted from the third party device 20 to the terminal device 10 at 375, the obfuscated content is transmitted to the server device 15 at 325 and is received by the server device 15 at 330. The unobfuscated content is not received by the server device 15 at 330. The transmission and reception of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism as would be apparent to a person of ordinary skill in the art. As noted above, the transmission and reception may also occur within a PAN. The transmission and reception of the obfuscated content may be a direct (device-to-device) transmission, or it may go through one or more intermediate devices, or it may be through a device network as would be apparent to a person of ordinary skill in the art.

Once the obfuscated content and/or specification (e.g., script or code) is received in 330, the server device 15 publishes the obfuscated content to one or more third-parties at 335. The publication in 335 may be done based on privacy settings associated with the obfuscated content item. In some example implementations, the privacy settings used may come from settings stored on the server device 15 or the privacy settings may be received by the server device 15 before, at the time of, or after receiving the obfuscated content item. In some example implementations, the privacy settings may be received from the third party device 20, or the terminal device 10.

At 335, the server device 15 may publish the obfuscated content to third-parties by directly sending the obfuscated content item to the one or more third-parties, which may include the third party device 20. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 340. A request to change the privacy settings may be received by the server device 15 from the terminal device 10, the third-device 20, another server device, or any other computing device that may be apparent to a person of ordinary skill in the art. If the server device 15 determines that no update request has been received at 340 (NO), the server device 15 continues to publish the obfuscated content to the one or more third-parties.

Conversely, if the server device 15 determines that an update request has been received at 340 (YES), the server device 15 performs a de-obfuscation process at 345 to produce a de-obfuscated content item. The de-obfuscation process may include reversing any blurring, scrambling, overwriting, removing or any other obfuscation performed by the terminal device in 315 or 320 to de-obfuscate a portion of the content item or the entire content item. Example de-obfuscation processes are discussed in greater detail below with respect to FIG. 11. At 345, the server device 15 may also publish the de-obfuscated content that includes the content item, and/or specification or algorithm (e.g., software code embedded as executable instructions in a non-transitory computer-readable medium), to one or more third-parties.

As with the publication to third-parties at 335 discussed above, the server device 15 may publish the de-obfuscated content to third-parties in 345 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 300 may be implemented with different, fewer, or more blocks. Process 300 may be implemented as computer executable instructions, which can be stored on a medium, loaded onto one or more processors of one or more computing devices, and executed as a computer-implemented method.

Example Implementation: Setting Determination at Server Device

Figure 4:
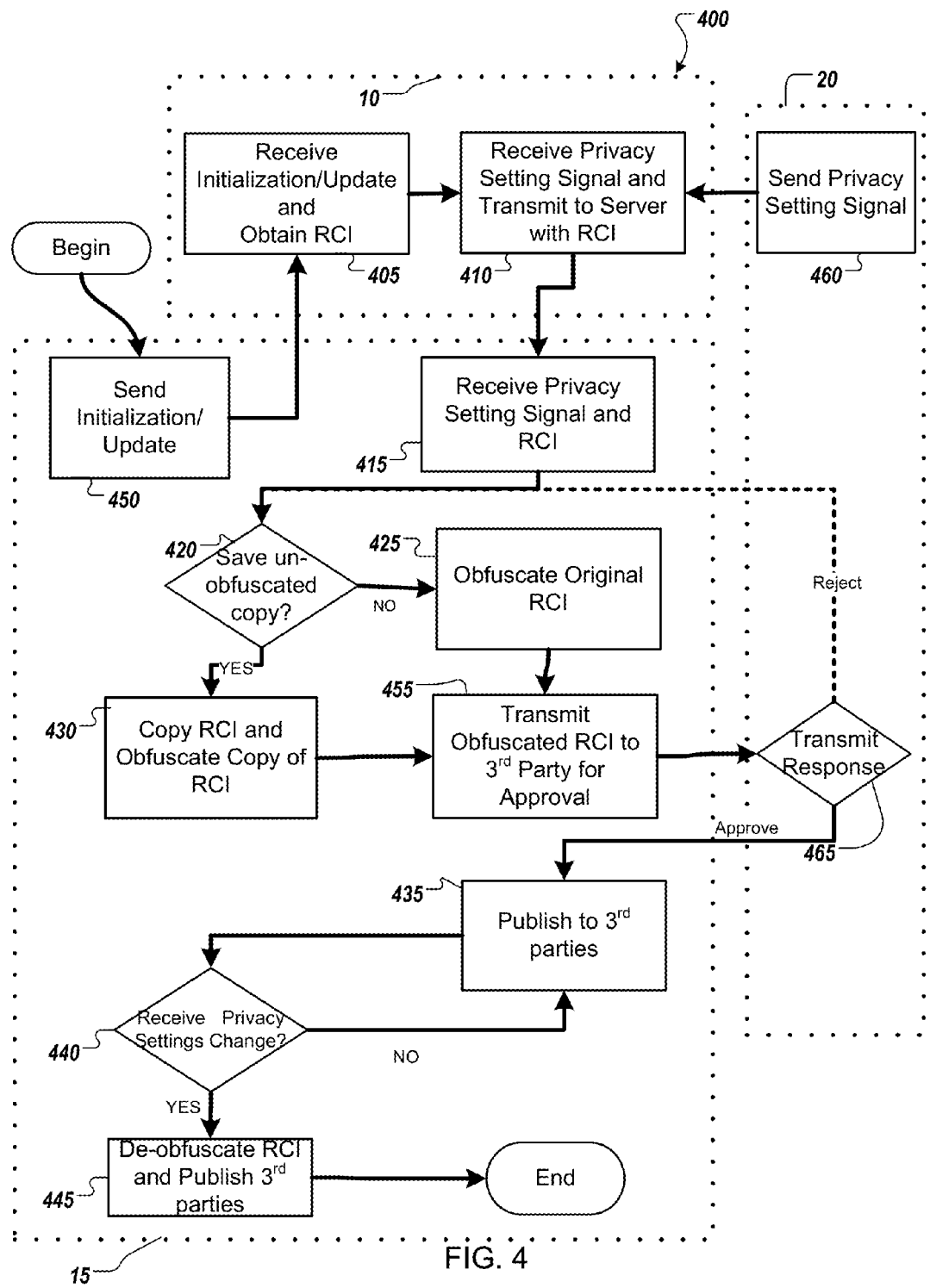
FIG. 4 shows a content publication process for a content item according to another example implementation.

FIG. 4 shows another content publication process 400 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 400 may be similar to aspects of the content publication process 200 discussed above and may use similar reference numerals. In this example implementation, the publication process 400 involves the exchange of information between a terminal device 10, a server device 15 and a third-party device 20. However, example implementations may involve the exchange of information between multiple terminal devices 10, multiple server devices 15, multiple third-party devices 20, any combination of terminal devices 10, server devices 15, and third-party devices 20 or no exchange of information (e.g., the entire process may be performed on a single terminal device 10, a single server device 15, or a single third-party device 20).

An example implementation of a terminal device 10 used in the content publication process 400 may be a mobile device, such as a phone, a music player, a digital camera, a tablet, a person computing device, or any other mobile device known to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 400 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service known to a person of ordinary skill in the art. An example implementation of a server device 15 is described in greater detail below with respect to FIG. 13.

An example implementation of a third-party device 20 may be any computing device that may be apparent to a person of ordinary skill in the art and may have components similar to those of the terminal device 10 shown in FIG. 12 or the server device 15 shown in FIG. 13. In some example implementations, the third-party device 20 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment).

Further, in some example implementations, the third-party device 20 may be one or more servers, personal computers, mainframes, blades or other computing devices. In some example implementations, a computing device may be considered a third-party device 20 if it is a separate device from both the terminal device 10 and the server device 15. However, in some example implementations of the process 400, the server device 15 may function as both the third-party device 20 and the server device 15.

In some example implementations, the third party device 20 may be a mobile device that is co-located at the substantially same location as the terminal device 10 at the time of obtaining of one or more content items as discussed in greater detail below.

In some example implementations of the content publishing process 400, the server device 15 sends an initialization and/or update signal to the terminal device 10 at 450. The transmission of the initialization and/or update signal is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission of the initialization and/or update signal may be a direct (device-to-device) transmission, or it may go through one or more intermediate devices, or it may be through a device network as would be apparent to a person of ordinary skill in the art.

At 405, the terminal device 10 receives the initialization and/or update signal and obtains a content item. The content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that would be apparent to a person of ordinary skill in the art. The content item may also be obtained by a media obtaining device external to the terminal device 10, such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

Though the process 400 illustrated in FIG. 4 includes the transmission and reception of the initialization and/or update signal, this aspect of the process is optional, and thus, some example implementations of the process may not require the transmission and reception of the initialization and/or update signal. In such example implementations, the process 400 may begin with the obtaining of the content item by the terminal device 10 in 405.

At the same time (e.g., substantially concurrently) that terminal device 10 is obtaining of the content item at 405, the third party device 20 may transmit a privacy setting signal at 460. In some example implementations, the privacy setting signal sent at 460 may include one or more privacy settings associated with a user of the third party device 20, which may be different from a user of the terminal device 10. The privacy setting signal may be implemented as an identifier for obtaining a personal or shared privacy (e.g., group) settings. Optionally, the privacy setting signal or its components may be obfuscated.

For example, the privacy setting signal may indicate a user's preferences for obtaining, obfuscating, and/or publication of the user's image, voice, name, or any other identifying features. In some example implementations, the privacy setting signal may include feature information associated with the user of the third party device. The feature information may also be information that can be used to identify the user of the third party device in the content item obtained by the terminal device. For example, the feature information may be facial features, biometric information, vocal patterns, or any other identifiable feature information. The feature information may also include person information identifying the user such as name, address, phone number, email address, user name, etc. The feature information may also include device information identifying the third-party device such as device id, device model, device location, etc.

The transmission of the privacy setting signal in 460 is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission also include wireline transmission mechanisms such as a LAN connection, a serial connection, a fiber-optic connection, a USB connection, or any other connection mechanism that would be known to a person of ordinary skill in the art. As noted above, the transmission and reception may also occur within a PAN. The transmission reception of the privacy setting signal may be a direct (device-to-device) transmission, or it may go through one or more intermediate devices, or it may be through a device network as may be apparent to a person of ordinary skill in the art.

After the privacy setting signal is transmitted at 460, the terminal device 10 receives the privacy setting signal and transmits the content item to the server device 15 with the privacy setting signal at 410. In some example implementations, the privacy setting signal may be embedded in the content item. In other example implementations, the privacy setting signal may be set separately from the content item. In the present example implementation associated with FIG. 4, the privacy setting signal is provided by the third-party device 20 to the terminal device 10, which forwards the privacy setting signal to the server device 15. However, in other example implementations, the privacy setting signal may be sent directly from the third-party device 20 to the server device 15.

The content item and privacy setting signal are then transmitted to the server device 15 at 410, the content item and privacy setting signal are received by the server device 15 at 415. The transmission and reception of the content item is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the content may be a direct (device-to-device) transmission, or it may go through one or more intermediate devices, or it may be through a device network as may be apparent to a person of ordinary skill in the art.

Once the content is received in 415, the server device 15 determines whether an unobfuscated copy of the content item should be saved or the content item should be obfuscated in real-time at 420. The determination in 420 is made based on privacy settings associated with the content item as well as the privacy setting signal received from the third-party device. In some example implementations, the privacy settings associated with the content item used may come from settings stored on the server device 15, or the privacy settings may be received by the server device 10 before, at the time of, or after obtaining the content item.

If the server device 15 determines that an unobfuscated copy of the content item should be saved at 420 (YES), the originally obtained content item is stored to storage in an un-obfuscated format and a copy of the obtained content is created, obfuscated, and stored to the storage at 430 to generate obfuscated content. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy setting signal received from the third-party device 20. For example, the feature information received with the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

Conversely, if the server device 15 determines that an unobfuscated copy of the content item should not be saved at 420 (NO), the originally obtained content item is obfuscated at 425 prior to being stored on the server device 15 to generate obfuscated content. Accordingly, only an obfuscated copy is stored, and no unobfuscated copy is stored. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy setting signal received from the third-party device 20. For example, the feature information received with the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Example obfuscation processes are discussed in greater detail below with respect to FIG. 10.

After the obfuscated content is generated at 425 or 430, the obfuscated content is transmitted from the server device 15 to the third-party device 20 at 455 for review and approval. The transmission of the obfuscated content to the third-party device 20 is based on the privacy setting signal received. The transmission of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the obfuscated content may be a direct (device-to-device) transmission, or it may go through one or more intermediate devices, or it may be through a device network as may be apparent to a person of ordinary skill in the art.

After the obfuscated content is transmitted to the third-party device 20, the third-party device 20 transmits a response either rejecting or approving the obfuscated content at 465. In some example implementations, the response may be based on an input received from a user via a user interface device, such as a button, switch, knob, screen press, audio input device (e.g., microphone configured to receive a voice input), a kinetic user input (e.g., motion-aware or touch-aware device configured to sense a user gesture, such as a camera, radar, wearable sensor including in apparel such as clothing, jewelry, glasses, etc.), or other user interface device that may be apparent to a person of ordinary skill in the art. In other example implementations, the response may be based on a comparison of the obfuscated content with the privacy settings stored on the third party device.

If the response transmitted by the third-party device 20 indicates that the obfuscated content is approved, the process 400 proceeds to 435, discussed below. Conversely, if the response transmitted by the third-party device 20 indicates that the obfuscated content is rejected, the process 400 may optionally (as indicated by the broken line) returns to 420 and repeats 420, 425, 430 and 455 to re-obfuscate the obtained content item one or more times in some example implementations. In other example implementations, the process 400 may simply terminate without returning to 420 if the response indicates the obfuscated content is rejected.

After the response indicative of approval is transmitted from the third party device 20 to the terminal device 10 at 465, the server device 15 publishes the obfuscated content to one or more third-parties at 435. The publication in 435 may be done based on privacy settings associated with the obfuscated content item. In some example implementations, the privacy settings used may come from settings stored on the server device 15 or the privacy settings may be received by the server device 15 before, at the time of, or after receiving the obfuscated content item. In some example implementations, the privacy settings may be received from the third party device 20, or the terminal device 10.

At 435, the server device 15 may publish the obfuscated content to third-parties by directly sending the obfuscated content item to the one or more third-parties, which may include the third party device 20. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 440. A request to change the privacy settings may be received by the server device 15 from the terminal device 10, the third-device 20, another server device, or any other computing device that may be apparent to a person of ordinary skill in the art. If the server device 15 determines that no update request has been received at 440 (NO), the server device 15 continues to publish the obfuscated content to the one or more third-parties.

Conversely, if the server device 15 determines that an update request has been received at 440 (YES), the server device 15 performs a de-obfuscation process at 445 to produce a de-obfuscated content item. The de-obfuscation process may include reversing any blurring, scrambling, overwriting, removing or any other obfuscation performed by the server device 15 in 425 or 430 to de-obfuscate a portion of the content item or the entire content item. Example de-obfuscation processes are discussed in greater detail below with respect to FIG. 11. At 445, the server device 15 may also publish the de-obfuscated content the server device 15 may also publish the de-obfuscated content that includes the content item, and/or specification or algorithm (e.g., software code embedded as executable instructions in a non-transitory computer-readable medium), to one or more third-parties.

As with the publication to third-parties at 435 discussed above, the server device 15 may publish the de-obfuscated content to third-parties in 445 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 400 may be implemented with different, fewer, or more blocks. Process 400 may be implemented as computer executable instructions, which can be stored on a medium, loaded onto one or more processors of one or more computing devices, and executed as a computer-implemented method.

Example Implementation: Colocation Aspect

Figure 5:
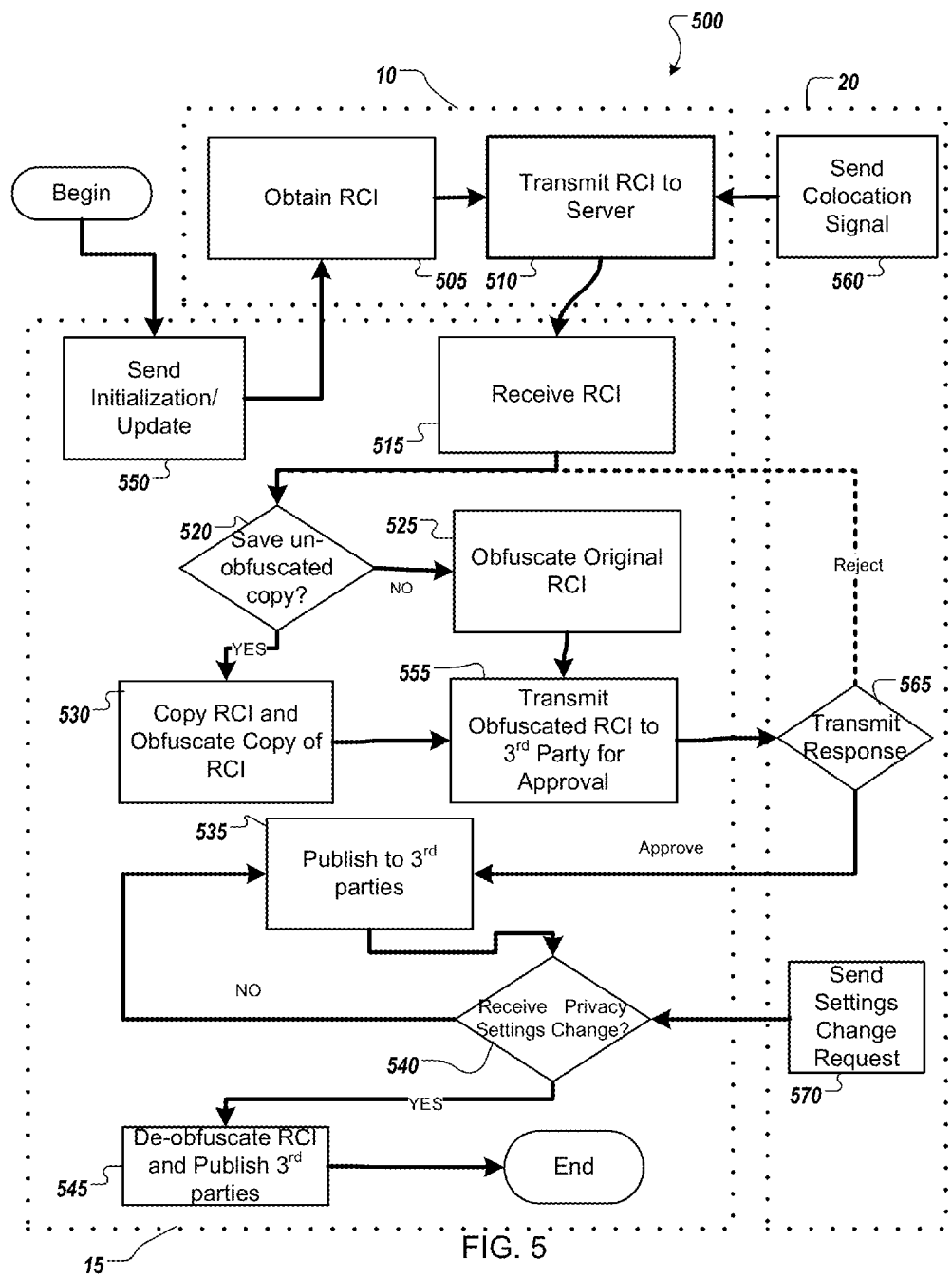
FIG. 5 shows a content publication process for a content item according to another example implementation.

FIG. 5 shows another content publication process 500 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 500 may be similar to aspects of the content publication process 400 discussed above and may use similar reference numerals.

In this example implementation, the publication process 500 involves the exchange of information between a terminal device 10, a server device 15 and a third-party device 20. However, example implementations may involve the exchange of information between multiple terminal devices 10, multiple server devices 15, multiple third-party devices 20, any combination of terminal devices 10, server devices 15, and third-party devices 20 or no exchange of information (e.g., the entire process may be performed on a single terminal device 10, a single server device 15, or a single third-party device 20).

An example implementation of a terminal device 10 used in the content publication process 500 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices.

The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 500 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service that would be apparent to a person of ordinary skill in the art. An example implementation of a server device 15 is described in greater detail below with respect to FIG. 13.

An example implementation of a third-party device 20 may be any computing device that may be apparent to a person of ordinary skill in the art and may have components similar to those of the terminal device 10 shown in FIG. 12 or the server device 15 shown in FIG. 13. In some example implementations, the third-party device 20 may be a mobile device, such as a phone, a music player, a digital camera, a tablet, a person computing device, mobile beacon or any other mobile device that would be apparent to a person of ordinary skill in the art. Further, in some example implementations, the third-party device 20 may be one or more servers, personal computers, mainframes, blades or other computing devices. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment).

In some example implementations, a computing device may be considered a third-party device 20 if it is to a separate device from both the terminal device 10 and the server device 15. However, in some example implementations of the process 500, the server device 15 may function as both the third-party device 20 and the server device 15.

In some example implementations, the third party device 20 may be a mobile device that is co-located at the substantially same location as the terminal device 10 at the time of obtaining of one or more content items as discussed in greater detail below.

In some example implementations of the content publishing process 500, the server device 15 sends an initialization and/or update signal to the terminal device 10 at 550. The transmission of the initialization and/or update signal is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission of the initialization and/or update signal may be a direct (device-to-device) transmission, or may go through one or more intermediate devices, or may be through a device network as may be apparent to a person of ordinary skill in the art.

At 505, the terminal device 10 receives the initialization and/or update signal and obtains a content item. The content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

Though the process 500 illustrated in FIG. 5 includes the transmission and reception of the initialization and/or update signal, example implementations of the process may not include the transmission and reception of the initialization and/or update signal. In such example implementations, the process 500 may begin with the obtaining of the content item by the terminal device 10 in 405.

At the same time that terminal device 10 is obtaining the content item at 505, the third party device 20 may transmit a colocation signal at 560 indicating that the third party device 20 is located in a vicinity of the terminal device 10 during the obtaining of the RCI at 505. In some example implementations, the colocation signal include global positioning information, latitude/longitude coordinates, compass bearings or any other information that may be used to identify an global location of the third party device 20. In still other example implementations, the colocation signal may include relative information indicating a location of the third party device 20 relative to the terminal device 10, such as distance and/or relative direction from the terminal device 10.

In some example implementations, the colocation signal sent at 560 may also optionally include one or more privacy settings associated with a user of the third party device 20, which may be different from a user of the terminal device 10. For example, a user's preferences for obtaining, obfuscating, and/or publication of the user's image, voice, name, or any other identifying features that may be apparent to a person of ordinary skill in the art may also be included in the colocation signal. In some example implementations, the colocation signal may include feature information associated with the user of the third party device 20. The feature information may also be information that can be used to identify the user of the third party device 20 in the content item obtained by the terminal device 10. For example, the feature information may be facial features, biometric information, vocal patterns, or any other identifiable feature information. The feature information may also include person information identifying the user such as name, address, phone number, email address, user name, etc. The feature information may also include device information identifying the third-party device such as device id, device model, etc.

The transmission of the colocation signal and/or privacy signal in 560 is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission reception of the colocation signal may be a direct (device-to-device) transmission, or it may go through one or more intermediate devices, or it may be through a device network as may be apparent to a person of ordinary skill in the art.

After the colocation signal is transmitted at 560, the terminal device 10 receives the colocation signal and transmits the content item to the server device 15 with the colocation signal at 510. In some example implementations, the colocation signal may be embedded in the content item. In other implementations, the colocation signal may set separately from the content item. In this example implementation, the colocation signal is sent from the third-party device 20 to the terminal device 10, which forwards to the server device 15. However, in other example implementations, the colocation signal may be sent directly from the third-party device 20 to the server device 15.

The content item and colocation signal is then transmitted to the server device 15 at 510, the content item and privacy setting signal are received by the server device 15 at 515. As explained above, the privacy setting signal may be implemented as an identifier for obtaining a personal or shared privacy (e.g., group) settings. Optionally, the privacy setting signal or its components may be obfuscated. The transmission and reception of the content item is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the content may be a direct (device-to-device) transmission, or it may go through one or more intermediate devices, or it may be through a device network as may be apparent to a person of ordinary skill in the art.

Once the content is received in 515, the server device 15 determines whether an unobfuscated copy of the content item should be saved or the content item should be obfuscated in real-time at 520. The determination in 520 is made based on privacy settings associated with the content item as well as the colocation signal received from the third-party device. In some example implementations, the privacy settings associated with the content item used may come from settings stored on the server device 15, or the privacy settings may be received by the server device 10 before, at the time of, or after obtaining the content item.

If the server device 15 determines that an unobfuscated copy of the content item should be saved at 520 (YES), the originally obtained content item is stored to storage in an un-obfuscated format and a copy of the obtained content is created, obfuscated, and stored to the storage at 530 to generate obfuscated content. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy setting signal received from the third-party device 20. For example, the feature information received with the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

Conversely, if the server device 15 determines that an unobfuscated copy of the content item should not be saved at 520 (NO), the originally obtained content item is obfuscated at 525 prior to being stored on the server device 15 to generate obfuscated content. Accordingly, only an obfuscated copy is stored, and no unobfuscated copy is stored. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the colocation signal received from the third-party device 20. For example, the colocation information may be used to determine retrieve the user of the third party device's 20 privacy settings stored on the server 15 and the retrieved privacy settings may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

After the obfuscated content is generated at 525 or 530, the obfuscated content is transmitted from the server device 15 to the third-party device 20 at 555 for review and approval. The transmission of the obfuscated content to the third-party device 20 based on the colocation signal received. The transmission of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. As noted above, the transmission and reception may also occur within a PAN. The transmission may also include wireline transmission mechanisms such as a LAN connection, a serial connection, a fiber-optic connection, a USB connection, or any other connection mechanism that would be apparent to a person of ordinary skill in the art. The transmission and reception of the obfuscated content may be a direct (device-to-device) transmission, or may go through one or more intermediate devices, or may be through a device network as would be apparent to a person of ordinary skill in the art.

After the obfuscated content is transmitted to the third-party device 20, the third-party device 20 transmits a response either rejecting or approving the obfuscated content at 565. In some example implementations, the response may be based on an input received from a user via a user interface device, such as a button, switch, knob, screen press, audio input device (e.g., microphone configured to receive a voice input), a kinetic user input (e.g., motion-aware or touch-aware device configured to sense a user gesture, such as a camera, radar, wearable sensor including in apparel such as clothing, jewelry, glasses, etc.), or other user interface device that may be apparent to a person of ordinary skill in the art. In other example implementations, the response may be based on a comparison of the obfuscated content with the privacy settings stored on the third party device.

If the response transmitted by the third-party device 20 indicates that the obfuscated content is approved, the process 500 proceeds to 535 discussed below. Conversely, if the response transmitted by the third-party device 20 indicates that the obfuscated content is rejected, the process 500 may optionally (as indicated by the broken line) returns to 520 and repeats 520, 525, 530 and 555 to re-obfuscate the obtained content item one or more times in some example implementations. In other example implementations, the process 500 may simply terminate without returning to 520 if the response indicates the obfuscated content is rejected.

After the response indicative of approval is transmitted from the third party device 20 at 565, the server device 15 publishes the obfuscated content to one or more third-parties at 535. The publication in 535 may be done based on privacy settings associated with the obfuscated content item. In some example implementations, the privacy settings used may come from settings stored on the server device 15 or the privacy settings may be received by the server device 15 before, at the time of, or after receiving the obfuscated content item. In some example implementations, the privacy settings may be received from the third party device 20, or the terminal device 10.

At 535, the server device 15 may publish the obfuscated content to third-parties by directly sending the obfuscated content item to the one or more third-parties, including the third party device 20. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 540. If the server device 15 determines that no update request has been received at 540 (NO), the server device 15 continues to publish the obfuscated content to the one or more third-parties.

At some point after the obfuscated content has been published by the server 15, the third party device 20 may send a privacy setting change request signal at 570. After the privacy setting change request is sent at 570, the server device 15 determines that an privacy setting change request has been received at 540 (YES), and performs a de-obfuscation process at 545 to produce a de-obfuscated content item. The de-obfuscation process may include reversing any blurring, scrambling, overwriting, removing or any other obfuscation performed by the server device 15 in 525 or 530 to de-obfuscate a portion of the content item or the entire content item. In some example implementations, the privacy setting change request may include settings identifying specific portions of the content item to be de-obfuscated. In other example implementations, the privacy setting change request may specify that the entire content item be de-obfuscated. Example de-obfuscation processes are discussed in greater detail below with respect to FIG. 11.

In 545, the server device 15 may also publish the de-obfuscated content that includes the content item, and/or specification or algorithm (e.g., software code embedded as executable instructions in a non-transitory computer-readable medium), to one or more third-parties. In some example implementations, the privacy setting change request may identify specific third-parties or groups of third-parties to whom the de-obfuscated content item may be published. In other example implementations, the privacy setting change request may specify that the de-obfuscated content item be published without limitation.

As with the publication to third-parties at 535 discussed above, the server device 15 may publish the de-obfuscated content to third-parties at 545 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
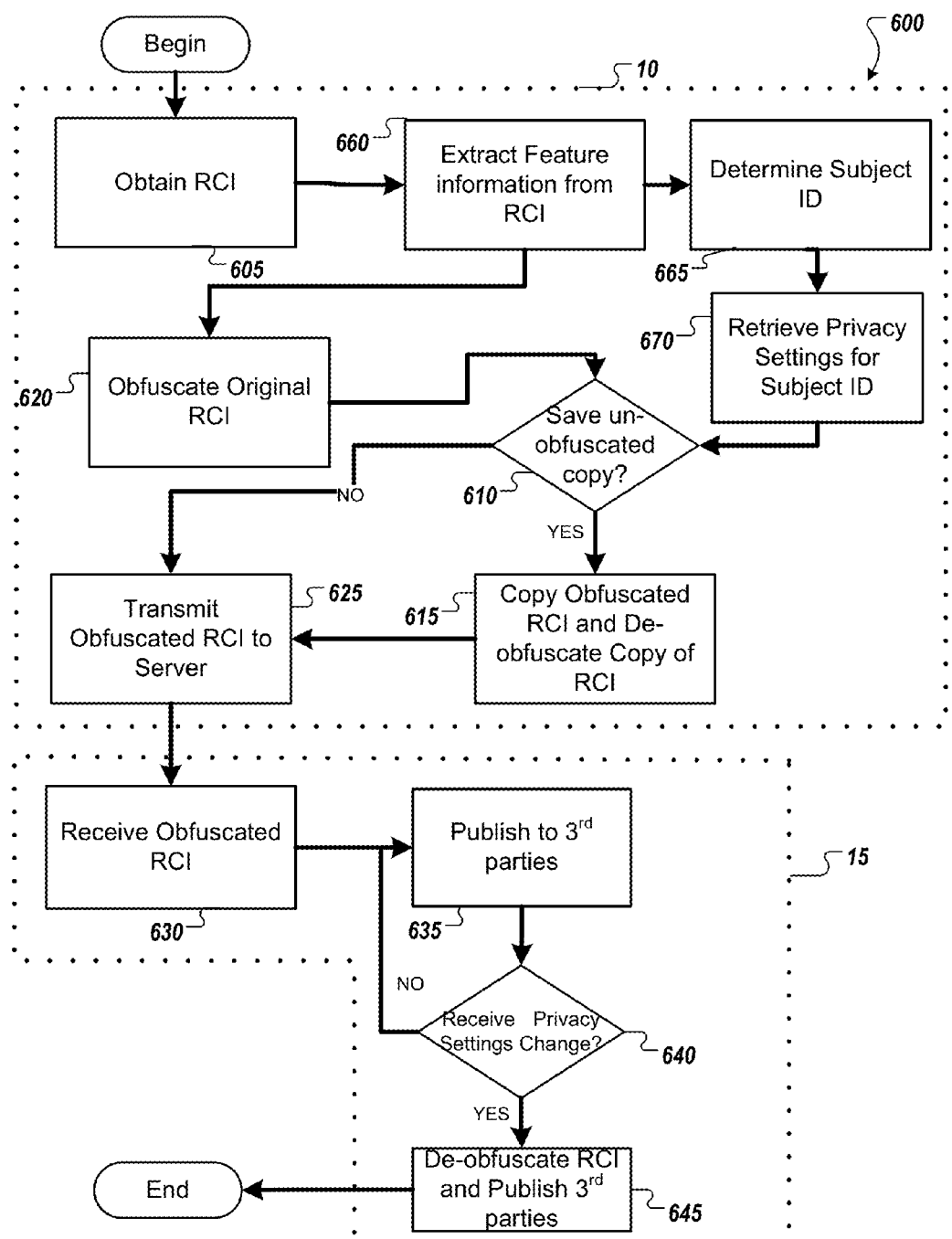
FIG. 6 shows a content publication process for a content item according to another example implementation.

Example Implementation: Obfuscate all Obtained Content at Terminal Device and De-Obfuscate Some Content at Terminal Device Based on Object Identification in Content FIG. 6 shows a content publication process 600 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 600 may be similar to aspects of the content publication process 100 discussed above.

In this example implementation, the publication process 600 involves the exchange of information between a terminal device 10 and a server device 15. However, example implementations may involve the exchange of information between multiple terminal devices 10, multiple server devices 15, any combination of terminal devices 10 and server devices 15, or no exchange of information (e.g., the entire process may be performed on a single terminal device 10 or a single server device 15).

An example implementation of a terminal device 10 used in the content publication process 600 may be a mobile device, such as a phone, a music player, a digital camera, a tablet, a person computing device, or any other mobile device that would be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 600 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service that may be apparent to a person of ordinary skill in the art. An example implementation of a server device 15 is described in greater detail below with respect to FIG. 13.

In this example implementation of the content publishing process 600, the terminal device 10 first obtains a content item in 605. The content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, including a peripheral device such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

Once the content item is obtained by the terminal device 10, the terminal device 10 extracts feature information from the content item using one or more information recognition processes at 660. For example, the terminal device 10 may use object recognition, image recognition, character recognition, audio recognition, voice recognition, or the like to extract feature information from the obtained content item. It is noted that the feature extraction as described herein is performed for the user that provides consent. For the purposes of discussion of all of the example implementations herein, the consent as provided and determined by the user may expire based on a user-determined condition (e.g., date, location, and/or count of time or usage occurrences, but not limited thereto).

The feature information may be information that can be used to identify a user in the content item obtained by the terminal device 10. For example, the feature information may be facial features, biometric information, vocal patterns, or any other identifiable feature information, when authorized by the user. The feature information may also include, when authorized by the user, personal information identifying the user such as name, address, phone number, email address, user name, etc. The feature information may also be any other information that could be used to recognition a user.

Once the feature information is extracted at 660, the terminal device determines a subject ID (e.g., identification associated with the object of the obtained content) at 665 based on the extracted feature information. In some example implementations, the subject ID may be determined by comparing the extracted feature information to a private database of features associated with users of a service provider. For example, the database may be an image database and associated user names of a social media service. The database of features may be stored locally on the terminal device or may be stored on another device, such as a server device 15 or any other device that may be apparent to a person of ordinary skill in the art. In all cases, the features are only stored or used with the consent of the user. When the database of features is stored on another device from the terminal device 10, the terminal device 10 may send the feature information to the device on which the database of features is stored and receive the subject ID as a response.

In other example implementations, the subject ID may be determined by comparing feature information to a public database, public search engine, or other public records that may be used to identify a subject based on feature information that may be apparent to a person of ordinary skill in the art. For example, the terminal device 10 may use the feature information to search newspapers, magazines, or other public records to extract a subject ID matching associated with the feature information. As noted above, these operations are only performed with the consent of the user.

Once the subject ID has been determined, the terminal device 10 may retrieve privacy settings associated with the subject ID at 670. The privacy settings may be retrieved from a privacy settings table stored on the terminal device 10, the server device 15, or any other device that would be apparent to a person of ordinary skill in the art. When the database of privacy settings is stored on another device from the terminal device 10, the terminal device 10 may send the subject ID to the device on which the database of privacy settings is stored and receive the privacy settings as a response.

In parallel with 660, 665 and 670, the originally obtained content item is obfuscated at 620 prior to being stored on the terminal device 10 to generate obfuscated content. In this example implementation, the originally obtained content item is obfuscated prior to storage on the terminal device. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy settings retrieved in 670. For example, the feature information used to retrieve the privacy setting signal may be used to identify portions of the content for obfuscation. In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Example obfuscation processes are discussed in greater detail below with respect to FIG. 10.

Once the privacy settings are retrieved and the originally obtained content is obfuscated, the terminal device 10 determines whether an unobfuscated copy of the content item should be saved at 610. The determination in 610 is made based on privacy settings associated with the content item as well as the privacy settings retrieved based on the feature information of the content. In some example implementations, the privacy settings associated with the content item used may come from settings stored on the terminal device 10 or the privacy settings may be received by the terminal device 10 before, at the time of, or after obtaining the content item.

If the terminal device 10 determines that an unobfuscated copy of the content item should be saved at 610 (YES), the obfuscated content item is copied, a de-obfuscated process is performed on the copy of the obfuscated content and the de-obfuscated copy is stored to storage at 615. The de-obfuscation process may include reversing any blurring, scrambling, overwriting, removing or any other obfuscation performed by the terminal device in 620 to de-obfuscate a portion of copy of the content item or the entire copy of the content item. Example de-obfuscation processes are discussed in greater detail below with respect to FIG. 11. After the de-obfuscated copy of the content item is stored to the storage of the terminal device 10, the process 600 proceeds to 625 for transmission of the obfuscated content item as discussed below.

Conversely, if the terminal device 10 determines that a de-obfuscated copy of the content item should not be saved at 610 (NO), the process 600 proceeds directly 625 without saving a de-obfuscated copy. After 610 or 615, the obfuscated content is transmitted from the terminal device 10 to the server device 15 at 625 and is received by the server device 15 at 630. The transmission and reception of the obfuscated content is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. As noted above, the transmission and reception may also occur within a PAN. The transmission and reception may also include wireline transmission mechanisms such as a LAN connection, a serial connection, a fiber-optic connection, a USB connection, or any other connection mechanism that would be known to a person of ordinary skill in the art. The transmission and reception of the obfuscated content may be a direct (device-to-device) transmission, or it may go through one or more intermediate devices, or it may be through a device network as may be apparent to a person of ordinary skill in the art.

Once the obfuscated content and/or specification (e.g., script or code) is received in 630, the server device 15 publishes the obfuscated content to one or more third-parties at 635. The unobfuscated content is neither received by the server at 630 nor published to the third party at 635. The publication in 635 may be done based on privacy settings associated with the obfuscated content item. In some example implementations, the privacy settings used may come from settings stored on the server device 15 or the privacy settings may be received by the server device 15 before, at the time of, or after receiving the obfuscated content item. In some example implementations, the privacy settings may be received from the third party device 20, or the terminal device 10. For example, the terminal device 10 may forward the privacy settings retrieved by the terminal device 10 in 670 to the server device 15 to use during the publication to one or more third parties at 635.

At 635, the server device 15 may publish the obfuscated content to third-parties by directly sending the obfuscated content item to the one or more third-parties. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 640. A request to change the privacy settings may be received by the server device 15 from the terminal device 10, another server device, or any other computing device that may be apparent to a person of ordinary skill in the art. If the server device 15 determines that no update request has been received at 640 (NO), the server device 15 continues to publish the obfuscated content to the one or more third-parties.

Conversely, if the server device 15 determines that an update request has been received at 640 (YES), the server device 15 performs a de-obfuscation process at 645 to produce a de-obfuscated content item. The de-obfuscation process may include reversing any blurring, scrambling, overwriting, removing or any other obfuscation performed by the terminal device in 615 or 620 to de-obfuscate a portion of the content item or the entire content item. Example de-obfuscation processes are discussed in greater detail below with respect to FIG. 11. At 645, the server device 15 may also publish the de-obfuscated content item to one or more third-parties.

As with the publication to third-parties at 635 discussed above, the server device 15 may publish the de-obfuscated content to third-parties in 645 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
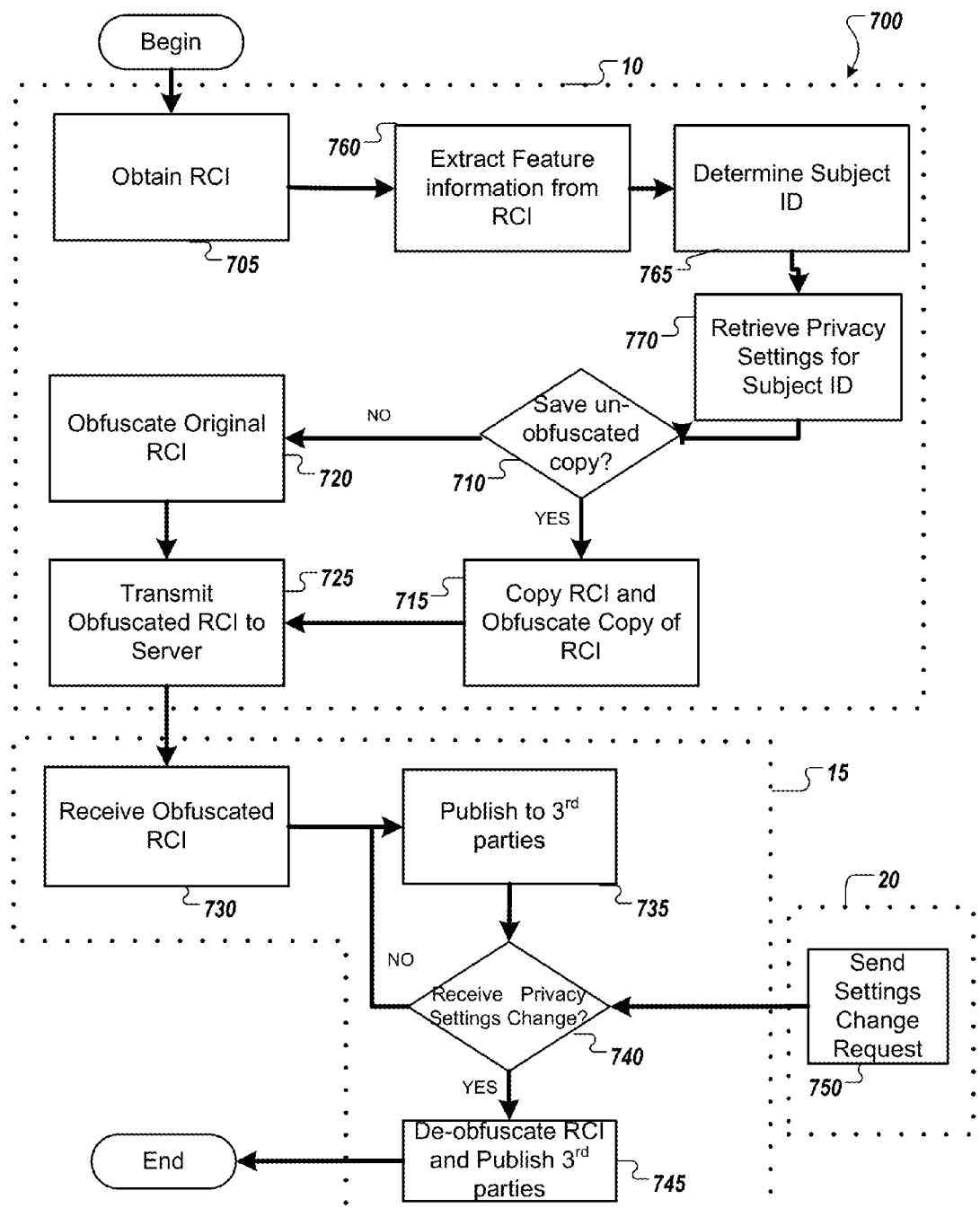
FIG. 7 shows a content publication process for a content item according to another example implementation.

Example Implementation: Identify Object in Content and Obfuscate at Terminal Device and Settings Change Request FIG. 7 shows a content publication process 700 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 700 may be similar to aspects of the content publication process 600 discussed above. For the sake of clarity and conciseness, aspects discussed above with respect to process 600 are not repeated below.

Once the content item is obtained by the terminal device 10, the terminal device 10 may extract feature information from the content item using one or more information recognition processes at 760. For example, the terminal device 10 may use object recognition, image recognition, character recognition, audio recognition, voice recognition, etc. to extract feature information from the obtained content item. The feature information is substantially the same as discussed above with respect to FIG. 6, for example.

Once the feature information is extracted at 760, the terminal device determines a subject ID at 765 based on the extracted feature information. In some example implementations, the subject ID may be determined by comparing the extracted feature information to a private database of features associated with users of a service provider. For example, the database may be an image database and associated user names of a social media service. The database of features may be stored locally on the terminal device or may be stored on another device, such as a server device 15, a third-party device 20, or any other device that may be apparent to a person of ordinary skill in the art. In all cases, the user information is not stored, accessed or used without the consent of the user and/or subject. When the database of features is stored on another device from the terminal device 10, the terminal device 10 may send the feature information to the device on which the database of features is stored and receive the subject ID as a response.

In other implementations, the subject ID may be determined by comparing feature information to a public database, public search engine, or other public records that may be used to identify a subject based on feature information that may be apparent to a person of ordinary skill in the art. For example, the terminal device 10 may use the feature information to search newspapers, magazines, or other public records to extract a subject ID matching associated with the feature information. As noted above, the user information is not stored, accessed or used without the consent of the user and/or subject.

Once the subject ID has been determined, the terminal device 10 may retrieve privacy settings associated with the subject ID at 770. The privacy settings may be retrieved from a privacy settings table stored on the terminal device 10, the server device 15, the third-party device 20, or any other device that may be apparent to a person of ordinary skill in the art. When the database of privacy settings is stored on another device from the terminal device 10, the terminal device 10 may send the subject ID to the device on which the database of privacy settings is stored and receive the privacy settings as a response.

Once the privacy settings are retrieved, the terminal device 10 determines whether an unobfuscated copy of the content item should be saved or the content item should be obfuscated in real-time at 710. The determination in 710 is made based on privacy settings associated with the content item as well as the privacy settings retrieved based on the feature information of the content. In some example implementations, the privacy settings associated with the content item used may come from settings stored on the terminal device 10 or the privacy settings may be received by the terminal device 10 before, at the time of, or after obtaining the content item.

If the terminal device 10 determines that an unobfuscated copy of the content item should be saved at 710 (YES), the originally obtained content item is stored to storage in an un-obfuscated format and a copy of the obtained content is created, obfuscated, and stored to the storage at 715 to generate obfuscated content. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy settings retrieved in 770. For example, the feature information used to retrieve the privacy setting signal may be used to identify portions of the content for obfuscation. The obfuscation is substantially similar to that described above with respect to FIG. 6.

Conversely, if the terminal device 10 determines that an unobfuscated copy of the content item should not be saved at 710 (NO), the originally obtained content item is obfuscated at 720 prior to being stored on the terminal device 10 to generate obfuscated content, and no unobfuscated content is stored. When the content item is obfuscated, at least of a portion of the content is obfuscated to render the portion of the content un-accessible (e.g., incapable of being viewed, heard, or in any other way received and comprehended by a third party). The portion of the content obfuscated may be selected based on the privacy settings retrieved in 770. For example, the feature information used to retrieve the privacy setting signal may be used to identify portions of the content for obfuscation. The obfuscation is substantially similar to that described above with respect to FIG. 6.

After the obfuscated content is generated at 715 or 720, the obfuscated content is transmitted from the terminal device 10 to the server device 15 at 725 and is received by the server device 15 at 730. The transmission and reception of the obfuscated content is substantially similar to that described above with respect to FIG. 6, for example.

Once the obfuscated content and/or specification (e.g., script or code) is received in 730, the server device 15 publishes the obfuscated content to one or more third-parties at 735. The publication in 735 may be done based on privacy settings associated with the obfuscated content item. In some example implementations, the privacy settings used may come from settings stored on the server device 15 or the privacy settings may be received by the server device 15 before, at the time of, or after receiving the obfuscated content item. In some example implementations, the privacy settings may be received from the third party device 20, or the terminal device 10. For example, the terminal device 10 may forward the privacy settings retrieved by the terminal device 10 in 770 to the server device 15 to use during the publication to one or more third parties at 735.

At 735, the server device 15 may publish the obfuscated content to third-parties by directly sending the obfuscated content item to the one or more third-parties, in a manner substantially similar to that described above with respect to FIG. 6, for example.

After the obfuscated content has been published to the one or more third-parties, the server terminal 15 determines if any requests to update or change the privacy settings associated with the obfuscated content item have been received at 740. If the server device 15 determines that no update request has been received at 740 (NO), the server device 15 continues to publish the obfuscated content to the one or more third-parties.

At some point after the obfuscated content has been published by the server 15, the third party device 20 may send a privacy setting change request signal at 750. After the privacy setting change request is sent at 750, the server device 15 determines that an privacy setting change request has been received at 740 (YES), and performs a de-obfuscation process at 745 to produce a de-obfuscated content item. The privacy settings change request may also be sent by the third party device to the privacy settings table used in 770.

The de-obfuscation process may include reversing any blurring, scrambling, overwriting, removing or any other obfuscation performed by the server device 15 in 725 or 730 to de-obfuscate a portion of the content item or the entire content item. In some example implementations, the privacy setting change request may include settings identifying specific portions of the content item to be de-obfuscated. In other implementations, the privacy setting change request may specify that the entire content item be de-obfuscated. De-obfuscation processes are discussed in greater detail below with respect to FIG. 11. In 745, the server device 15 may also publish the de-obfuscated content that includes the content item, and/or specification or algorithm (e.g., software code embedded as executable instructions in a non-transitory computer-readable medium), to one or more third-parties.

As with the publication to third-parties at 735 discussed above, the server device 15 may publish the de-obfuscated content to third-parties in 745 by directly sending the de-obfuscated content item to the one or more third-parties. The de-obfuscated content item may be directly sent to the one or more third-parties as in a manner substantially similar to that described above with respect to FIG. 6.

In some examples, process 700 may be implemented with different, fewer, or more blocks. Process 700 may be implemented as computer executable instructions, which can be stored on a medium, loaded onto one or more processors of one or more computing devices, and executed as a computer-implemented method.

Figure 8:
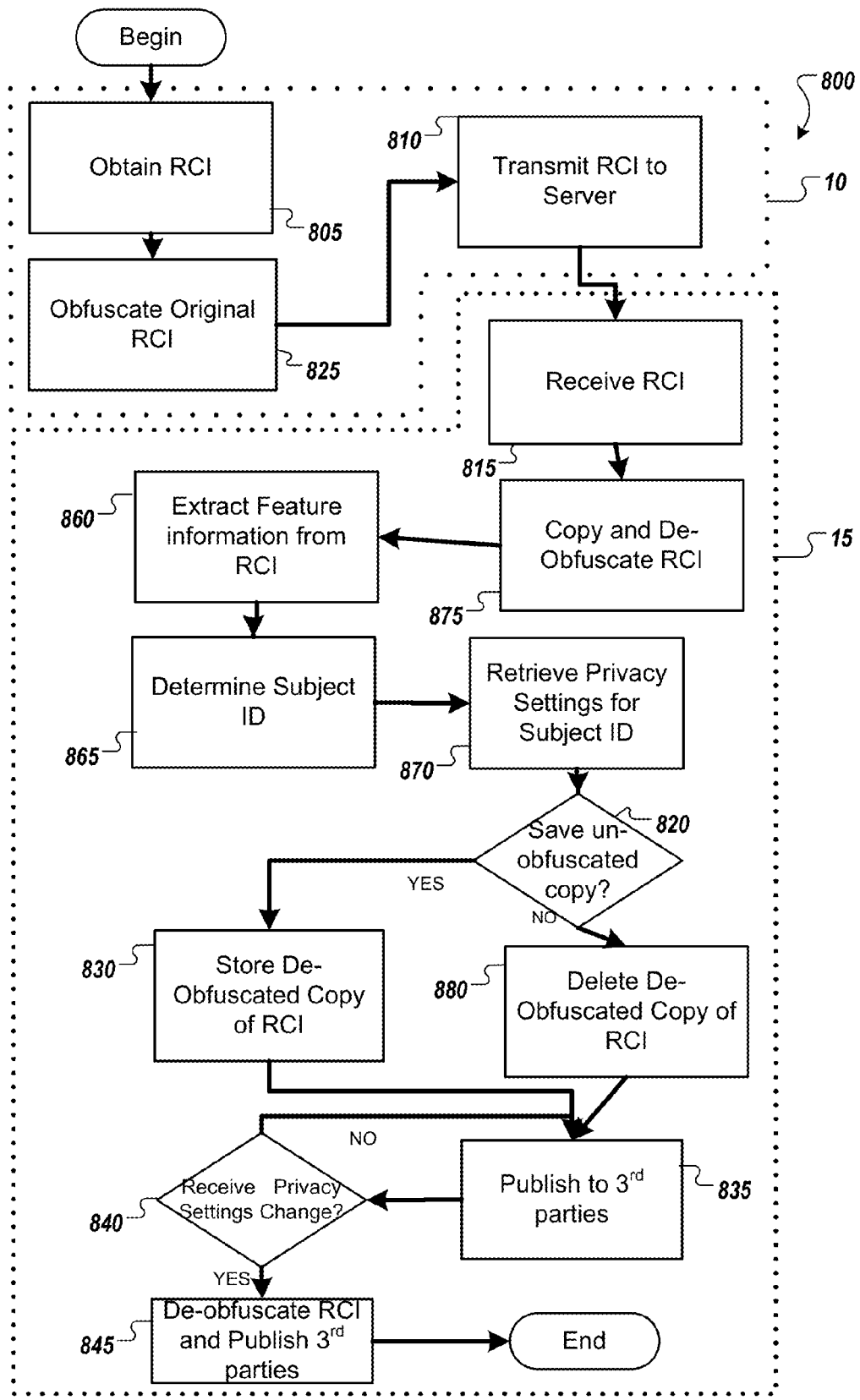
FIG. 8 shows a content publication process for a content item according to another example implementation.

Example Implementation: Obfuscate all Obtained Content at Terminal Device and Store Some De-Obfuscated Content at Server Device Based on Object Identification in Content FIG. 8 shows another content publication process 800 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 800 may be similar to aspects of the content publication process 200 discussed above. In this example implementation, the publication process 800 involves the exchange of information between a terminal device 10 and a server device 15. However, example implementations may involve the exchange of information between multiple terminal devices 10, multiple server devices 15, any combination of terminal devices 10 and server devices 15, or no exchange of information (e.g., the entire process may be performed on a single terminal device 10 or a single server device 15).

An example implementation of a terminal device 10 used in the content publication process 800 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

An example implementation of a server device 15 used in the content publication process 800 may be one or more servers, personal computers, mainframes, blades or other computing devices. Further, the server device 15 may be associated with one or more online-service providers. For example, the server device 15 may be associated with a social media provider, search provider, email provider, instant messaging provider, content/media sharing provider, blog hosting provider, news provider, or any other on-line service that may be apparent to a person of ordinary skill in the art. An example implementation of a server device 15 is described in greater detail below with respect to FIG. 13.

In this example implementation of the content publishing process 800, the terminal device 10 obtains a content item in 805. A content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

After the content item is obtained by the terminal device in 805, the originally obtained content item is obfuscated at 825 to generate obfuscated content. In this example implementation, the originally obtained content item is obfuscated prior to transmission to the server device 15. When the content item is obfuscated, at least of a portion of the content is obfuscated to render the portion of the content un-accessible (e.g., incapable of being viewed, heard, or in any other way received and comprehended by a third party). In some example implementations, the obfuscation may include blurring, scrambling, overwriting, removing or any other obfuscation mechanism that may be used to obscure or hide at least a portion of the content item. In other example implementations, obfuscation may additionally or alternatively include encrypting the entire content item or some portion of the content item, such as an image layer, audio layer, script, content specification, metadata, etc. In some example implementations, the entire content item, rather than a portion thereof may be obfuscated. Further, all or part of the content item, such as the metadata, content specification, or script, may be used to generate a meta-level description, which can in turn be used to potentially facilitate subsequent determinations to share, transfer, render, and/or publish the content item. Obfuscation processes are discussed in greater detail below with respect to FIG. 10.

After the obfuscated content is generated in 825, the obfuscated content item is transmitted from the terminal device 10 to the server device 15 at 810 and is received by the server device 15 at 815. The transmission and reception of the content item is not particularly limited, and may include wireless transmission mechanisms such as Bluetooth, near-field communication (NFC), WI-FI transmission, cellular transmission, radio transmission, infrared transmission, wireless optical communication (e.g., signal transmitted by light, such as unguided light) or any other wireless transmission mechanism that may be apparent to a person of ordinary skill in the art. The transmission and reception may also include wireline transmission mechanisms such as a LAN connection, a serial connection, a fiber-optic connection, a USB connection, or any other connection mechanism that may be apparent to a person of ordinary skill in the art. As noted above, the transmission and reception may also occur within a PAN. The transmission and reception of the content may be a direct (device-to-device) transmission, or it may go through one or more intermediate devices, or it may be through a device network as may be apparent to a person of ordinary skill in the art.

Once the content is received by the server device 15 at 815, the server device 15 may make a copy of the obfuscated content item received and perform a de-obfuscated process on the copy of the obfuscated content at 875. The de-obfuscation process may include reversing any blurring, scrambling, overwriting, removing or any other obfuscation performed by the terminal device in 825 to de-obfuscate a portion of the copy of the content item or the entire copy of the content item. Example de-obfuscation processes are discussed in greater detail below with respect to FIG. 11. After a de-obfuscated copy of the content item is created, the server device 15 may extract feature information, with user and/or subject consent, from the content item using one or more information recognition processes at 860. For example, the server device 15 may use object recognition, image recognition, character recognition, audio recognition, voice recognition, etc. to extract feature information from the obtained content item.

The feature information may be information that can be used to identify a user in the content item obtained by the terminal device 10, with user and/or subject consent. For example, the feature information may be facial features, biometric information, vocal patterns, or any other identifiable feature information. The feature information may also include, when authorized by the user, personal information identifying the user such as name, address, phone number, email address, user name, etc. The feature information may also be any other information that could be used to recognition a user.

Once the feature information is extracted at 860, the server device 15 determines a subject ID at 865 based on the extracted feature information. In some example implementations, the subject ID may be determined by comparing the extracted feature information to a private database of features associated with users of a service provider. For example, the database may be an image database and associated user names of a social media service. The database of features may be stored locally on the server device 15 or may be stored on another device, such as a terminal device 10, or any other device that may be apparent to a person of ordinary skill in the art. As noted above, user and/or subject consent is obtained prior to use of the information, and may expire based on a user-determined condition (e.g., date, location, and/or count of time or usage occurrences, but not limited thereto). When the database of features is stored on another device from the server device 15, the server device 15 may send the feature information to the device on which the database of features is stored and receive the subject ID as a response.

In other implementations, the subject ID may be determined by comparing feature information to a public database, public search engine, or other public records that may be used to identify a subject based on feature information that may be apparent to a person of ordinary skill in the art. For example, the server device 15 may use the feature information to search newspapers, magazines or other public records to extract a subject ID matching associated with the feature information, with the permission of the user.

Once the subject ID has been determined, the server device 15 may retrieve privacy settings associated with the subject ID at 870. The privacy settings may be retrieved from a privacy settings table stored on the server device 15, the terminal device 10, or any other device that may be apparent to a person of ordinary skill in the art. When the database of privacy settings is stored on another device from the server device 15, the server device 15 may send the subject ID to the device on which the database of privacy settings is stored and receive the privacy settings as a response.

Once the privacy settings are retrieved, the server device 15 determines whether an unobfuscated copy of the content item should be saved at 820. The determination in 820 is made based on the privacy settings retrieved in 870.

If the server device 15 determines that an unobfuscated copy of the content item should be saved at 820 (YES), the de-obfuscated copy of the originally obtained content item is stored to storage in an un-obfuscated format.

Conversely, if the server device 15 determines that an unobfuscated copy of the content item should not be saved at 820 (NO), the de-obfuscated copy of the originally obtained content is deleted. After either 830 or 880 have been performed, the server device 15 publishes the obfuscated content to one or more third-parties at 835. The publication at 835 may be done based on the privacy settings retrieved in 870.

At 835, the server device 15 may publish the obfuscated content to third-parties by directly sending the obfuscated content item to the one or more third-parties. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the obfuscated content to the one or more third-parties indirectly. For example, the server device 15 may send the one or more third-parties a link to a secure webpage for downloading the obfuscated content based on the privacy settings. Further, the server device 15 may also publish the obfuscated content to a secure website accessible only by the one or more third-parties, or the server device 15 may publish the obfuscated content (e.g., to a publicly accessible website, or to an online application of a third party, such as an online mobile application having software or a software agent resident on a mobile device), based on the privacy settings. For example, but not by way of limitation, the privacy settings may be directed to an individual account privacy setting, or privacy settings associated with a social graph (e.g., group or social circle associated with the individual account).

After the obfuscated content has been published to the one or more third-parties, the server terminal 15 determines if any requests to update or change the privacy settings associated with the obfuscated content item have been received at 840. A request to change the privacy settings may be received by the server device 15 from the terminal device 10, another server device, or any other computing device that may be apparent to a person of ordinary skill in the art. If the server device 15 determines that no update request has been received at 840 (NO), the server device 15 continues to publish the obfuscated content to the one or more third-parties.

Conversely, if the server device 15 determines that an update request has been received at 840 (YES), the server device 15 performs a de-obfuscation process at 845 to produce a de-obfuscated content item. The de-obfuscation process may include reversing any blurring, scrambling, overwriting, removing or any other obfuscation performed by the terminal device in 825 or 830 to de-obfuscate a portion of the content item or the entire content item. De-obfuscation processes are discussed in greater detail below with respect to FIG. 11. At 845, the server device 15 may also publish the de-obfuscated content that includes the content item, and/or specification or algorithm (e.g., software code embedded as executable instructions in a non-transitory computer-readable medium), to one or more third-parties.

As with the publication to third-parties at 835 discussed above, the server device 15 may publish the de-obfuscated content to third-parties at 845 by directly sending the de-obfuscated content item to the one or more third-parties. For example, the server device 15 may send the de-obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The server device 15 may also publish the de-obfuscated content to the one or more third-parties indirectly. For example, the server device 15 may send the one or more third-parties a link to a secure webpage for downloading the de-obfuscated content based on the privacy settings. Further, the server device 15 may also publish the de-obfuscated content to a secure website accessible only by the one or more third-parties, or the server device 15 may publish the de-obfuscated content (e.g., to a publicly accessible website, or to an online application of a third party, such as an online mobile application having software or a software agent resident on a mobile device), based on the privacy settings.

In some examples, process 800 may be implemented with different, fewer, or more blocks. Process 800 may be implemented as computer executable instructions, which can be stored on a medium, loaded onto one or more processors of one or more computing devices, and executed as a computer-implemented method.

Figure 9:
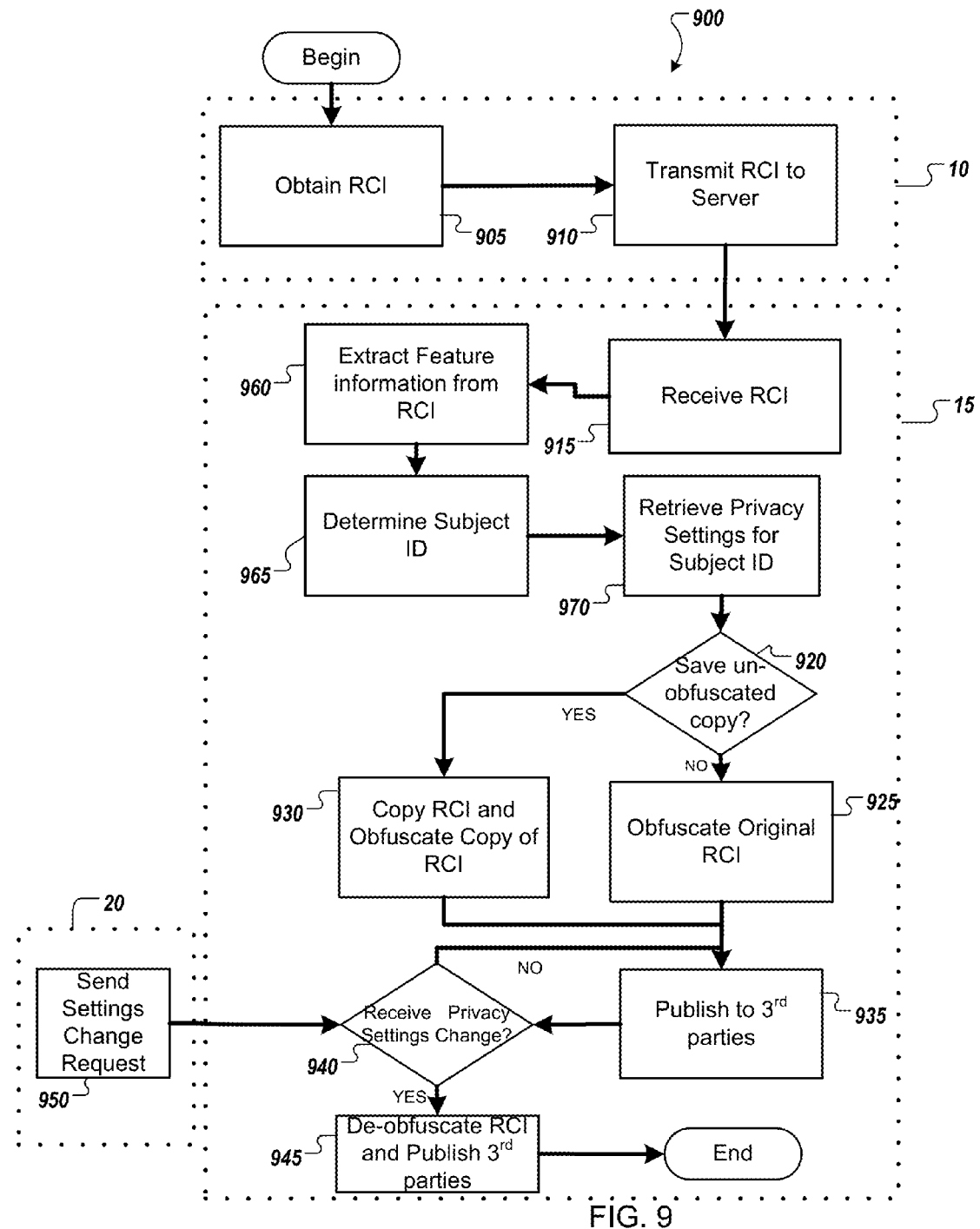
FIG. 9 shows a content publication process for a content item according to another example implementation.

Example Implementation: Identify Object in Content and Obfuscate at Server Device and Settings Change Request FIG. 9 shows another content publication process 900 for a content item according to another example implementation. In some example implementations, the content item may be a rich content item ("RCI") combining (e.g., two or more of) text, image, audio, video, animation, and any other media information. Further, the RCI may include, but is not limited to, a specification of the content items or their attributes (e.g., metadata). Some aspects of the content publication process 900 may be similar to aspects of the content publication process 800 discussed above. For the sake of clarity and conciseness, aspects discussed above with respect to process 800 are not repeated below.

An example implementation of a terminal device 10 used in the content publication process 900 may be a mobile device, such as a phone, a music player, a digital camera, a tablet, a person computing device, or any other mobile device that may be apparent to a person of ordinary skill in the art. As noted above, the mobile device (e.g., terminal device) may include a network of personal components or devices (e.g., PAN) and/or mobile devices. The mobile device may also be a mobile gaming device communicatively coupled to interact with other mobile gaming devices in a multiplayer game environment (e.g., three-dimensional visual environment). An example implementation of a terminal device 10 is described in greater detail below with respect to FIG. 12.

In this example implementation of the content publishing process 900, the terminal device 10 obtains a content item in 905. A content item may be an image, a video clip, an audio clip, a text document, a blog post, or any other type of content item that may be apparent to a person of ordinary skill in the art. In some example implementations, the content item obtained by the terminal device 10 may be a rich content item ("RCI") combining (e.g., two or more of) text, image, audio, video, animation, and any other media information that may be apparent to a person of ordinary skill in the art. The content item may be obtained using a media obtaining device integrated into the terminal device 10, such as an onboard image sensor (e.g. a CCD sensor, a CMOS sensor, an NMOS sensor, etc.), an onboard audio sensor, or any other sensor that may be apparent to a person of ordinary skill in the art. The content item may also be obtained by a media obtaining device external to the terminal device 10, such as a camera or microphone connected to the terminal device 10. As explained above, the RCI may also include metadata, and as a result, the media obtaining device may include a sensor that is structured to obtain the metadata, such as an environmental sensor. Other sensors or devices that may collect meta-data may be substituted for the environmental sensor without departing from the scope of the example implementation.

After the content item is obtained by the terminal device in 905, the content item is transmitted to the server device 15 at 910 and is received by the server device 15 at 915. It is noted that in the content publication process 900, no obfuscation process is performed on the content by the terminal device 10 prior to transmission to the server device 15.

Once the content is received in 915, the server device 15 may extract feature information (with user/subject consent) from the content item using one or more information recognition processes at 960. For example, the server device 15 may use object recognition, image recognition, character recognition, audio recognition, voice recognition, etc. to extract feature information from the obtained content item. The feature information of the content item is substantially the same as discussed above with respect to FIG. 8, for example.

Once the feature information is extracted at 960, the server device 15 determines a subject ID at 965 based on the extracted feature information. In some example implementations, the subject ID may be determined by comparing the extracted feature information to a private database of features associated with users of a service provider. For example, the database may be an image database and associated user names of a social media service. The database of features may be stored locally on the server device 15 or may be stored on another device, such as a terminal device 10, a third-party device 20 or any other device that may be apparent to a person of ordinary skill in the art (with user/subject consent). When the database of features is stored on another device from the server device 15, the server device 15 may send the feature information to the device on which the database of features is stored and receive the subject ID as a response.

In other implementations, the subject ID may be determined by comparing feature information to a public database, public search engine, or other public records that may be used to identify a subject based on feature information that may be apparent to a person of ordinary skill in the art. For example, the server device 15 may use the feature information to search newspapers, magazines or other public records to extract a subject ID matching associated with the feature information, with user/subject consent.

Once the subject ID has been determined, the server device 15 may retrieve privacy settings associated with the subject ID at 970. The privacy settings may be retrieved from a privacy settings table stored on the server device 15, the terminal device 10, a third-party device 20, or any other device that may be apparent to a person of ordinary skill in the art. When the database of privacy settings is stored on another device from the server device 15, the server device 15 may send the subject ID to the device on which the database of privacy settings is stored and receive the privacy settings as a response.

Once the privacy settings are retrieved, the server device 15 determines whether an unobfuscated copy of the content item should be saved or the content item should be obfuscated in real-time at 920. The determination in 820 is made based on the privacy settings retrieved in 970.

If the server device 15 determines that an unobfuscated copy of the content item should be saved at 920 (YES), the originally obtained content item is stored to storage in an un-obfuscated format and a copy of the obtained content is created, obfuscated, and stored to the storage at 930 to generate obfuscated content. When the content item is obfuscated, at least of a portion of the content is obfuscated to render the portion of the content un-accessible (e.g., incapable of being viewed, heard, or in any other way received and comprehended by a third party). In some example implementations, the portion of the content obfuscated may be selected based on the privacy settings retrieved in 970. The obfuscation of the content item is substantially the same as discussed above with respect to FIG. 8, for example.

Conversely, if the server device 15 determines that an unobfuscated copy of the content item should not be saved at 920 (NO), the originally obtained content item is obfuscated at 925 prior to being stored on the server device 15 to generate obfuscated content. When the content item is obfuscated, at least of a portion of the content is obfuscated to render the portion of the content un-accessible (e.g., incapable of being viewed, heard, or in any other way received and comprehended by a third party). In some example implementations, the portion of the content obfuscated may be selected based on the privacy settings retrieved in 970. The obfuscation of the content item is substantially the same as discussed above with respect to FIG. 8, for example.

After the obfuscated content is generated in 925 and/or 930, the server device 15 publishes the obfuscated content to one or more third-parties at 935. The publication in 935 may be done based on the privacy settings retrieved in 970.

At 935, the server device 15 may publish the obfuscated content to third-parties, possibly including third party device 20, by directly sending the obfuscated content item to the one or more third-parties. For example, the server device 15 may send the obfuscated content item to the one or more third-parties by email, instant message, file-transfer-protocol (FTP), public or private online social network interaction application, or any other party-to-party transfer mechanism that may be apparent to a person of ordinary skill in the art based on the privacy settings. The publishing of the obfuscated content by the server device is substantially the same as discussed above with respect to FIG. 8, for example.

After the obfuscated content has been published to the one or more third-parties, the server terminal 15 determines if any requests to change or update the privacy settings associated with the obfuscated content item have been received at 940. If the server device 15 determines that no update request has been received at 940 (NO), the server device 15 continues to publish the obfuscated content to the one or more third-parties.

At some point after the obfuscated content has been published by the server 15, the third party device 20 may send a privacy setting change request signal at 950. After the privacy setting change request is sent at 950, the server device 15 determines that an privacy setting change request has been received at 940 (YES), and performs a de-obfuscation process at 945 to produce a de-obfuscated content item. The privacy settings change request may also be sent by the third party device to the privacy settings table used in 770.

The de-obfuscation process may include reversing any blurring, scrambling, overwriting, removing or any other obfuscation performed by the terminal device in 925 or 930 to de-obfuscate a portion of the content item or the entire content item. De-obfuscation processes are discussed in greater detail below with respect to FIG. 11. In 945, the server device 15 may also publish the de-obfuscated content that includes the content item, and/or specification or algorithm (e.g., software code embedded as executable instructions in a non-transitory computer-readable medium), to one or more third-parties.

As with the publication to third-parties at 935 discussed above, the server device 15 may publish the de-obfuscated content to third-parties in 945 by directly sending the de-obfuscated content item to the one or more third-parties. The direct sending of the de-obfuscated content item to the one or more third parties is substantially the same as discussed above with respect to FIG. 8, for example.

In some examples, process 900 may be implemented with different, fewer, or more blocks. Process 900 may be implemented as computer executable instructions, which can be stored on a medium, loaded onto one or more processors of one or more computing devices, and executed as a computer-implemented method.

Example Implementation: Obfuscation Process

Figure 10:
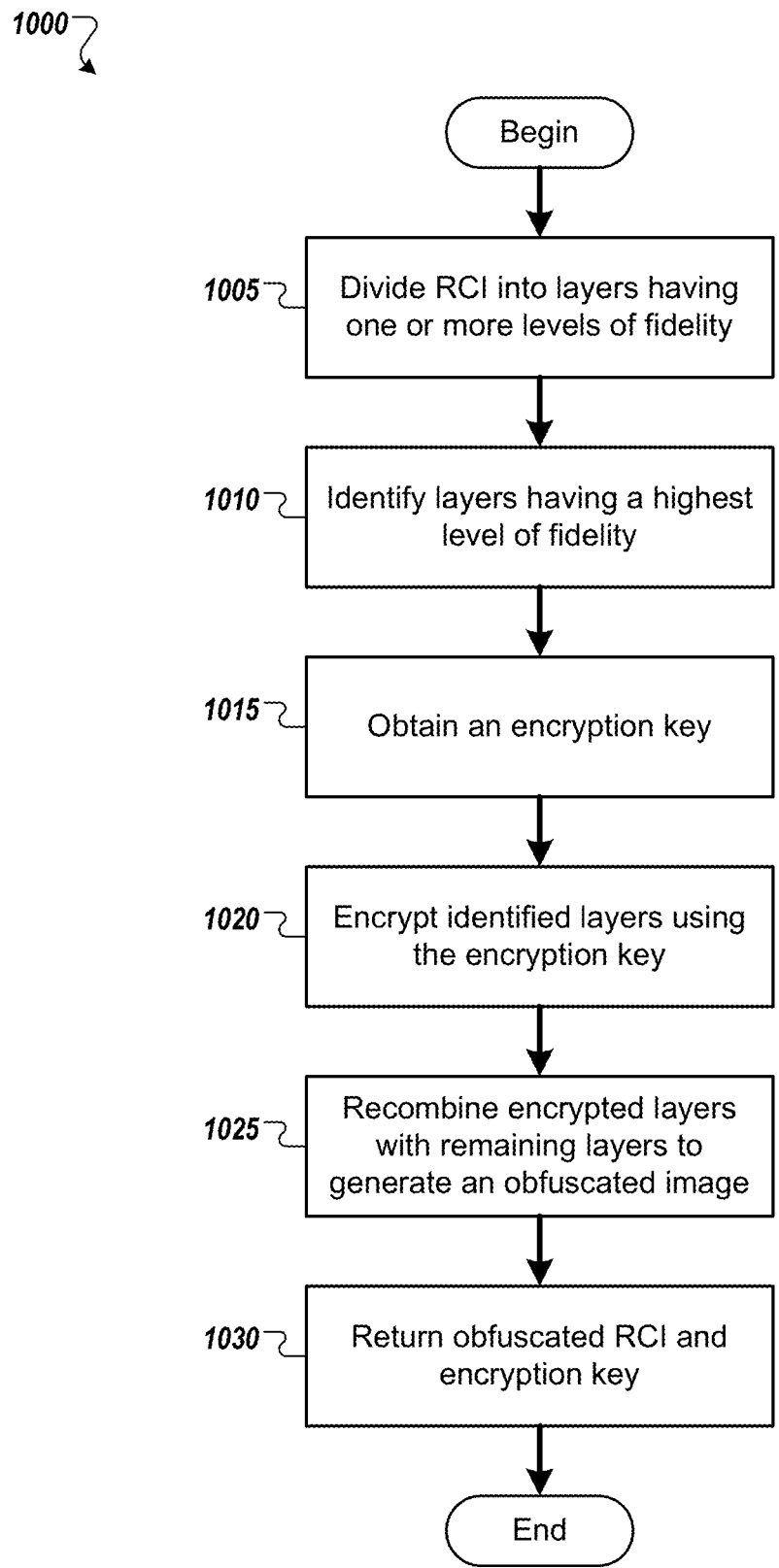
FIG. 10 shows a content obfuscation process according to an example implementation.

FIG. 10 illustrates an example implementation of a content obfuscation process 1000 that may be used in one or more of the above discussed example implementations of content publication processes. The content obfuscation process 1000 may be performed by the terminal device 10, the server device 15, a third-party device 20, or any other computing device that may be apparent to a person of ordinary skill in the art. In 1005, the content item is divided into a plurality of content layers having various levels of detail or fidelity using content processing methods. For example, an image content item may be divided into layers based on colors, shades, shapes, textures, line patterns or any other image characteristic that can be used divide the image into different layers. The layers of the image content item may be structured to be perceived in height, width and depth dimensions (e.g., three-dimensional or "3D"), or height and width dimensions (e.g., two-dimensional or "2D"). As another example, an audio content item may be divided into a plurality of layers based on pitch, timbre, frequency, or any other audio characteristic that can be used to divide the audio into different layers. In another example, a video content item may be divided into a plurality of individual images, and the each image may be divided into layers based on colors, shades, shapes, textures, line patterns, or any other image characteristic that may be apparent to a person of ordinary skill in the art. Further, a video content item may also be divided into a plurality of layers based on audio characteristics associated with the video. The layers of the video content item may be structured to be perceived in height, width and depth dimensions (e.g., 3D), or height and width dimensions (e.g., 2D). By dividing content into different levels of fidelity or other characteristics and applying varying degrees of privacy or security to the individual levels as described below, example implementations may allow varied levels of obfuscation of the content. For example shared content may be blurred, or rendered such that only colors or basic shapes are viewable in certain situations while higher fidelity information, such as high resolution image data or metadata may be obscured.

After the content item is divided into a plurality of layers, the plurality of layers are analyzed to identify the layers having the highest levels of fidelity in 1010. Depending on composition of the content item, layers associated with particular colors, shades, shapes, textures, line patterns, etc. may have greater fidelity that other layers. For example, layers associated with specific aspects (such as shape, texture, pattern, etc.) of an item in the content (such as a face) may have greater fidelity than layers associated with other aspects of the same item in the content.

Once the layers having the greatest fidelity are identified, one or more encryption keys may be generated or otherwise obtained in 1015. The generation of an encryption key is not particularly limited and may include random number generation, pseudorandom number generation, or any other encryption key generation methods that may be apparent to a person of ordinary skill in the art. In some implementations, a repository of pre-generated encryption keys may be stored on the terminal device 10 or server device 15 and one or more encryption keys may be obtained from the repository, rather than being generated as needed. The encryption key size is also not particularly limited and in some implementations may include symmetric keys having lengths of 32 bit, 64 bit, 128 bit, 192 bit 256 bit, or any other key size that may be apparent to a person of ordinary skill in the art. In other implementations, the asymmetric (public) encryption keys of longer lengths (2048+ bits, for example) may be used. In some example implementations, the key size may be selected to prevent decryption by current key-breaking methods, but to allow the key to be broken at some future time, as explained below. For example, a key size may be selected to prevent the encryption from being broken for at least 10 years. For example, but not by way of limitation, based on current technologies, a 256 bit symmetric encryption key may be used as is currently used for higher-sensitivity documents.

After the encryption key is generated, the encryption key may be used in 1020 to encrypt the content layer or layers identified in 1010 as having the highest layers of fidelity. The encryption is not particularly limited and may include any encryption scheme that may be apparent to a person of ordinary skill in the art. In some example implementations, the encryption scheme may be selected to prevent decryption by current brute force encryption breaking methods, but to allow the encryption to be broken at some future time to allow the content to be easily decrypted without the key after the passage of time. For example, an encryption scheme may be selected to prevent the encryption from being broken for at least 10 years but after 10 years the content can be decrypted and reviewed un-obfuscated.

Once the identified layers are encrypted, the content item may be reformulated in 1025 by recombining the encrypted layers with any unencrypted layers to form an obfuscated content item. As at least some of the layers of the content item are encrypted, the encrypted layers are obfuscated when accessed (e.g., viewed, heard, or in any other way received and comprehended by a third party) without the encryption key. However, the encrypted layers are still present in the obfuscated content item and thus the original content item can be accessed (e.g., viewed, heard, or in any other way received and comprehended by a third party) if the encryption key is in the possession of a user accessing the obfuscated content item.

Once the encrypted and decrypted layers have been recombined, the obfuscated RCI and corresponding encryption key are returned to the terminal device 10, server device 15, or third-party device 20 at 1030 and the process ends. In some example implementations, when the obfuscated content item is published to third-parties the encryption key is retained on the server device 15 for later use as needed. In other implementations, the encryption key may be distributed to at least some of the third-parties based on privacy settings associated with the content item or users associated with feature information of the content item. For example, a public key infrastructure may be employed to issue limited time or limited use certificates to third parties to use the key. Other alternative implementations may also be used.

In some examples, process 1000 may be implemented with different, fewer, or more blocks. Process 1000 may be implemented as computer executable instructions, which can be stored on a medium, loaded onto one or more processors of one or more computing devices, and executed as a computer-implemented method.

Example Implementation: De-Obfuscation Process

Figure 11:
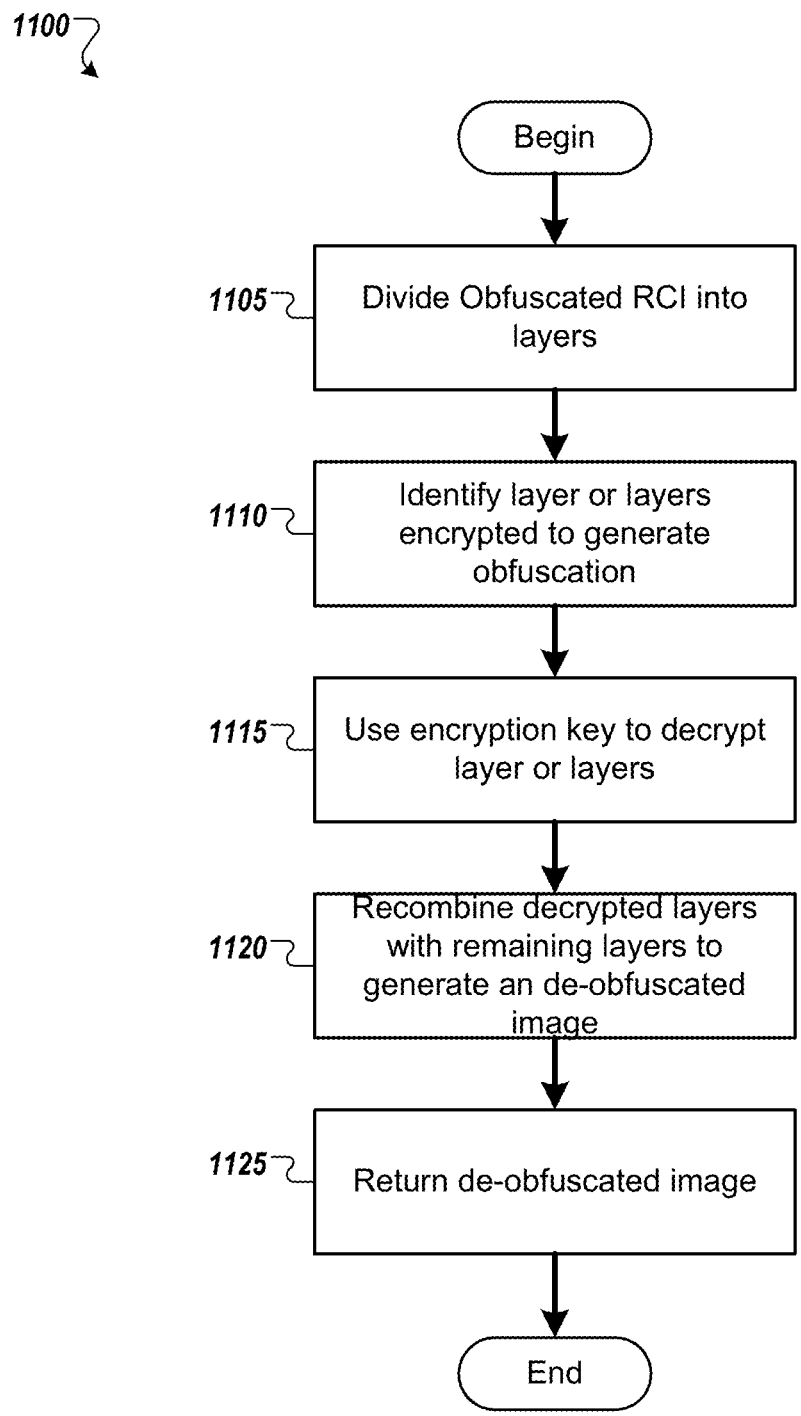
FIG. 11 shows a content de-obfuscation process according to an example implementation.

FIG. 11 illustrates an example implementation of a content de-obfuscation process 1100 that may be used in one or more of the above discussed example implementations of content publication processes. The content obfuscation process 1100 may also be performed by the terminal device 10, the server device 15, a third-party device 20, or any other computing device that may be apparent to a person of ordinary skill in the art. In 1105, the obfuscated content item is divided into a plurality of content layers, similar to the dividing performed in 1005 of FIG. 10. The content layers have various levels of detail or fidelity. For example, an image content item may be divided into layers based on colors, shades, shapes, textures, line patterns or any other image characteristic that can be used divide the image into different layers. By dividing content into different levels of fidelity or other characteristics and applying varying degrees of privacy or security to the individual levels as described below, example implementations may allow varied levels of obfuscation of the content. For example shared content may be blurred, or rendered such that only colors or basic shapes are viewable in certain situations while higher fidelity information, such as high resolution image data or metadata may be obscured.

After the content item is divided into a plurality of layers, the plurality of layers are analyzed to identify which layers have been encrypted in 1110. Once the encrypted layers have been identified, the encrypted layers are decrypted at 1115 using the one or more keys generated or otherwise obtained in 1015 of FIG. 10.

Once the identified layers are decrypted, the content item may be reformulated in 1120 by recombining the decrypted layers with any unencrypted layers to form a de-obfuscated content item. As all the layers of the content item are now unencrypted, the content item should no longer appear obfuscated.

Once the de-obfuscated content item is generated, the de-obfuscated content item is returned to the terminal device 10, server device 15, or third-party device 20 at 1125 and the process ends. In some example implementations, when the de-obfuscated content item may be re-published to third-parties as discussed above in the example implementations of the content publication processes.

In some examples, process 1100 may be implemented with different, fewer, or more blocks. Process 1100 may be implemented as computer executable instructions, which can be stored on a medium, loaded onto one or more processors of one or more computing devices, and executed as a computer-implemented method.

Example Implementation: Terminal Device

FIG. 12 shows a terminal device 10 according to an example implementation. The terminal device 10 may be in computing environment 1200 that can include one or more processing units, cores, or processors 1205, memory 1210 (e.g., RAM, ROM, and/or the like), internal storage 1215 (e.g., magnetic, optical, solid state storage, and/or organic), and/or I/O interface 1220, any of which can be coupled on a communication mechanism or bus 1225 for communicating information embedded in the terminal device 10.

The terminal device may include, but is not limited to a distributed network of personal devices, communicatively coupled by a personal area network (PAN), or a combination of personal and public devices that are communicatively coupled, for example but not by of limitation, by the PAN. Further, the terminal device may include a network of personal components or devices (e.g., PAN) and/or mobile devices. In an example implementation, the terminal device may be a mobile gaming device communicatively coupled to interact with other mobile gaming devices in a multiplayer game environment (e.g., three-dimensional visual environment).

The terminal device 10 can be communicatively coupled to input/user interface 1230 and output device/interface 1235. Either one or both of input/user interface 1230 and output device/interface 1235 can be a wireline or wireless interface and can be detachable. Input/user interface 1230 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1235 may include a display, television, monitor, printer, speaker, braille, or the like. In some example implementations, input/user interface 1230 and output device/interface 1235 can be embedded with or physically coupled to the terminal device 10. In other example implementations, terminal devices 10 may function as or provide the functions of input/user interface 1230 and output device/interface 1235 for a terminal device 10.

The terminal device 10 may also be communicatively coupled to a content obtaining device 1240 capable of obtaining one or more content items. The content obtaining device may include any device, component, or sensor, physical or virtual, that can be used to obtain input (e.g., microphone, still-camera, video-camera, audio sensor, CCD sensor, a CMOS sensor, an NMOS sensor, environmental sensor, sensor configured to collect metadata, and/or the like).

The terminal device 10 may also be communicatively coupled to other types of on-device sensors 1232 capable of collecting other information from the environment surrounding the terminal device 10 and the terminal device's position relative to the environment. The sensors may include thermal sensors, moisture sensors, wind sensors, GPS sensors, or any other sensor that may be apparent to a person of ordinary skill in the art.

Examples of terminal device 10 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Terminal device 10 can be communicatively coupled to a network 1245 via a transmitter 1250 and a receiver 1255. The network 1245 may enable communicating with any number of networked components, devices, and systems, including one or more computing devices (such as another terminal device 10, a server device 15 and/or a third-party device 20) of the same or different configuration.

The transmitter 1250 may be configured to enable transmission of information and data to the one or more computing devices (such as another terminal device 10, a server device 15 and/or a third-party device 20) either directly or through the network 1245. For example, the transmitter 1250 may be used to send security credentials, content items, user IDs, device location information, encryption keys, device information, or any other data and information to the one or more computing devices directly or through the network 1245.

The receiver 1255 may be configured to enable reception of information and data from the one or more computing devices (such as another terminal device 10, a server device 15 and/or a third-party device 20) either directly or through the network. For example, the receiver 1255 may be used to receive software updates, policies (such as security and privacy policies), applications, user IDs, or any other data or information from a server device 15 directly or through the network 1245. Further, the receiver 1255 may also be used to receive location information, privacy settings, user IDs and/or any other data and information from a third party device 20 directly or through the network.

The I/O interface 1220 can include, but is not limited to, wireline and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in the computing environment 1200. Similarly, the transmitter 1250 can include, but is not limited to wireline and/or wireless transmitter using any communication protocols or standards (e.g., Ethernet, 802.11x, Universal System Bus, WiMAX, modem, a cellular network protocol, and the like) for communicating information to any other connected devices and/or networks in the computing environment 1200.

Further, the receiver 1255 can include, but is not limited to wireline and/or wireless receiver using any communication protocols or standards (e.g., Ethernet, 802.11x, Universal System Bus, WiMAX, modem, a cellular network protocol, and the like) for communicating information to any other connected devices and/or networks in the computing environment 1200. Network 1350 can be any network or combination of networks (e.g., the Internet, local area network, wide area network, a telephonic network, a cellular network, satellite network, and the like).

The terminal device 10 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The terminal device 10 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1205 can execute under any operating system (OS) 1260, in a native or virtual environment. One or more applications can be deployed that include a logic unit 1257, an application programming interface (API) unit 1265, encryption app 1270, content feature extraction app 1275, user ID determining app 1280, layer processing app 1285, privacy settings table 1290, and inter-unit communication mechanism 1295 for the different units to communicate with each other, with the OS 1260, and with other applications (not shown). For example, encryption app 1270, content feature extraction app 1275, user ID determining app 1280, layer processing app 1285, and privacy settings table 1290 may implement one or more processes shown in FIGS. 1-11. The described units and elements can be varied in design, function, configuration, or implementation and are not limited to the descriptions provided.

In some example implementations, when content information or an execution instruction is received by API unit 1265, it may be communicated to one or more other units (e.g., encryption app 1270, content feature extraction app 1275, user ID determining app 1280, layer processing app 1285, and privacy settings table 1290). For example, when a content item is received by the API unit 1265, the content feature extraction app 1275 may extract feature information from the received content and provide the extracted feature information to the user ID determining app 1280. Further, the user ID determining app 1280 may determine one or more user IDs based on the received feature information and provide the user IDs to the privacy settings table 1290.

Additionally, the privacy settings table 1290 may provide privacy settings associated with the provided user IDs to the layer processing app 1285 and the encryption app 1270. The layer processing app 1285 may divide the content item into a plurality of layers based on the provided privacy settings associated with the user IDs and provide one or more of the layers to the encryption app 1270. The encryption app 1270 may generate an encryption key and encrypt the one or more layers provided by the layer processing app 1285 based on the privacy settings received from the privacy settings table 1290.

Further, the encryption app 1270 may also provide the encrypted layers to the layer processing app 1285 and the layer processing app 1285 may recombine the encrypted layers with any non-encrypted layers to generate the obfuscated content as discussed above in FIG. 10. The API unit 1265 may provide the obfuscated content to the transmitter 1250 to send to another computing device such as a server device 15 or a third-party device 20.

In some instances, logic unit 1257 may be configured to control the information flow among the units and direct the services provided by the API unit 1265, encryption app 1270, content feature extraction app 1275, user ID determining app 1280, layer processing app 1285, and privacy settings table 1290 in some example implementations described above. For example, the flow of one or more processes or implementations may be controlled by logic unit 1257 alone or in conjunction with API unit 1260.

Example Implementation: Server Device

FIG. 13 shows a server device 15 according to an example implementation. The server device 15 may be in computing environment 1300 that can include one or more processing units, cores, or processors 1305, memory 1310 (e.g., RAM, ROM, and/or the like), internal storage 1315 (e.g., magnetic, optical, solid state storage, and/or organic), and/or I/O interface 1320, any of which can be coupled on a communication mechanism or bus 1325 for communicating information embedded in the server device 15.

The server device 15 can be communicatively coupled to input/user interface 1330 and output device/interface 1335. Either one or both of input/user interface 1330 and output device/interface 1335 can be a wireline or wireless interface and can be detachable. Input/user interface 1330 may include any device, component, sensor, or interface, physical or virtual, which can be used to provide input (e.g., buttons, touch-screen interface, keyboard, pointing/cursor control, microphone, camera, braille, motion sensor, optical reader, and/or the like). Output device/interface 1335 may include a display, television, monitor, printer, speaker, braille, or the like. In some example implementations, input/user interface 1330 and output device/interface 1335 can be embedded with or physically coupled to the terminal device 10. In other example implementations, server device 15 may function as or provide the functions of input/user interface 1330 and output device/interface 1335 for a server device 15.

Examples of the server device 15 may include, but are not limited to devices not designed for mobility (e.g., desktop computers, servers, mainframes, information kiosks, televisions with one or more processors embedded therein and/or coupled thereto, radios, and the like). The server device 15 may be associated with one or more online-service providers. For example, the server device 15 may be associated with a social media provider, search provider, email provider, instant messaging provider, content/media sharing provider, blog hosting provider, news provider, or any other on-line service that may be apparent to a person of ordinary skill in the art. The server device 15 may also include highly mobile devices (e.g., smartphones, devices in vehicles and other machines, devices carried by humans and animals, and the like), mobile devices (e.g., tablets, notebooks, laptops, personal computers, portable televisions, radios, and the like), The server device 15 can be communicatively coupled to a network 1345 via a transmitter 1350 and a receiver 1355. The network 1345 may enable communicating with any number of networked components, devices, and systems, including one or more computing devices (such as a terminal device 10, another server device 15 and/or a third-party device 20) of the same or a different configuration.

The transmitter 1350 may be configured to enable transmission of information and data to the one or more computing devices (such as a terminal device 10, another server device 15 and/or a third-party device 20) either directly or through the network 1345. For example, the transmitter 1350 may be used to send software updates, policies (such as security and privacy policies), applications, user IDs, content for publication, or any other data and information to the one or more computing devices directly or through the network 1345.

The receiver 1355 may be configured to enable reception of information and data from the one or more computing devices (such as a terminal device 10, another server device 15 and/or a third-party device 20) either directly or through the network. For example, the receiver 1355 may be used to receive security credentials, content items, user IDs, device location information, encryption keys, device information, or any other data or information from a terminal device 10 directly or through the network 1345. Further, the receiver 1355 may also be used to receive location information, privacy settings, user IDs and/or any other data and information from a third party device 20 directly or through the network.

The server device 15 may also be communicatively coupled to a social media interface 1340 capable of controlling or interfacing with one or more of a social media, content sharing, content publishing, and/or content distribution service or the like. The social media interface may control or interface with the social media service etc. directly or through the network 1345. The social media interface 1340 may include, but is not limited to, wireline and/or wireless interfaces using any communication or protocols or standards (e.g., Ethernet, 802.11x, Universal System Bus, WiMAX, modem, a cellular network protocol, and the like) for communicating information to and/or from one or more of a social media, content sharing, content publishing, and/or content distribution service or the like in the computing environment 1300.

The server device 15 may also be communicatively coupled to other types of on-device sensors 1332 capable of collecting other information from the environment surrounding the terminal device 10 and the terminal device's position relative to the environment. The sensors may include thermal sensors, moisture sensors, wind sensors, GPS sensors, or any other sensor that may be apparent to a person of ordinary skill in the art.

The I/O interface 1320 can include, but is not limited to, wireline and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in the computing environment 1300. Similarly, the transmitter 1350 can include, but is not limited to wireline and/or wireless transmitter using any communication protocols or standards (e.g., Ethernet, 802.11x, Universal System Bus, WiMAX, modem, a cellular network protocol, and the like) for communicating information to any other connected devices and/or networks in the computing environment 1300.

Further, the receiver 1355 can include, but is not limited to wireline and/or wireless receiver using any communication protocols or standards (e.g., Ethernet, 802.11x, Universal System Bus, WiMAX, modem, a cellular network protocol, and the like) for communicating information to any other connected devices and/or networks in the computing environment 1300. Network 1350 can be any network or combination of networks (e.g., the Internet, local area network, wide area network, a telephonic network, a cellular network, satellite network, and the like).

The server device 15 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The server device 15 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1305 can execute under any operating system (OS) 1360, in a native or virtual environment. One or more applications can be deployed that include a logic unit 1357, an application programming interface (API) unit 1365, encryption unit 1370, content feature extraction unit 1375, user ID determining unit 1380, layer processing unit 1385, privacy settings table 1390, a social media interface unit 1397 and inter-unit communication mechanism 1395 for the different units to communicate with each other, with the OS 1360, and with other applications (not shown). For example, encryption unit 1370, content feature extraction unit 1375, user ID determining unit 1380, layer processing unit 1385, privacy settings table 1390, and a social media interface unit 1397 may implement one or more processes shown in FIGS. 1-11. The described units and elements can be varied in design, function, configuration, or implementation and are not limited to the descriptions provided.

In some example implementations, when content information or an execution instruction is received by API unit 1365, it may be communicated to one or more other units (e.g., encryption unit 1370, content feature extraction unit 1375, user ID determining unit 1380, layer processing unit 1385, and privacy settings table 1390). For example, when a content item is received by the API unit 1365, the content feature extraction unit 1375 may extract feature information from the received content and provide the extracted feature information to the user ID determining unit 1380. Further, the user ID determining unit 1380 may determine one or more user IDs based on the received feature information and provide the user IDs to the privacy settings table 1390.

Additionally, the privacy settings table 1390 may provide privacy settings associated with the provided user IDs to the layer processing unit 1385 and the encryption unit 1370. The layer processing unit 1385 may divide the content item into a plurality of layers based on the provided privacy settings associated with the user IDs and provide one or more of the layers to the encryption unit 1370. The encryption unit 1370 may generate an encryption key and encrypt the one or more layers provided by the layer processing unit 1385 based on the privacy settings received from the privacy settings table 1390.

Further, the encryption unit 1370 may also provide the encrypted layers to the layer processing unit 1385 and the layer processing unit 1385 may recombine the encrypted layers with any non-encrypted layers to generate the obfuscated content as discussed above in FIG. 10. The API unit 1365 may provide the obfuscated content to the transmitter 1350 to send to another computing device such as another server device 15, a terminal device 10 or a third-party device 20. The API unit 1365 may also provide the obfuscated content to the social media interface unit 1397 to control the social media interface 1340 to publish the obfuscated content to the one or more a social media, content sharing, content publishing, and/or content distribution service or the like.

Additionally, the encryption unit 1370 and the layer processing unit 1385 may also de-obfuscate obfuscated content as described in FIG. 11 in response to receiving a privacy settings change request from the API unit 1365. Further, in response to the privacy settings change request the social media interface unit 1397 may control the social media interface 1340 to re-publish the de-obfuscated content to the one or more a social media, content sharing, content publishing, and/or content distribution service or the like.

In some instances, logic unit 1357 may be configured to control the information flow among the units and direct the services provided by the API unit 1365, encryption unit 1370, content feature extraction unit 1375, user ID determining unit 1380, layer processing unit 1385, privacy settings table 1290, and the social media interface unit 1397 in some example implementations described above. For example, the flow of one or more processes or implementations may be controlled by logic unit 1357 alone or in conjunction with API unit 1360.

Example Environment

Figure 14:
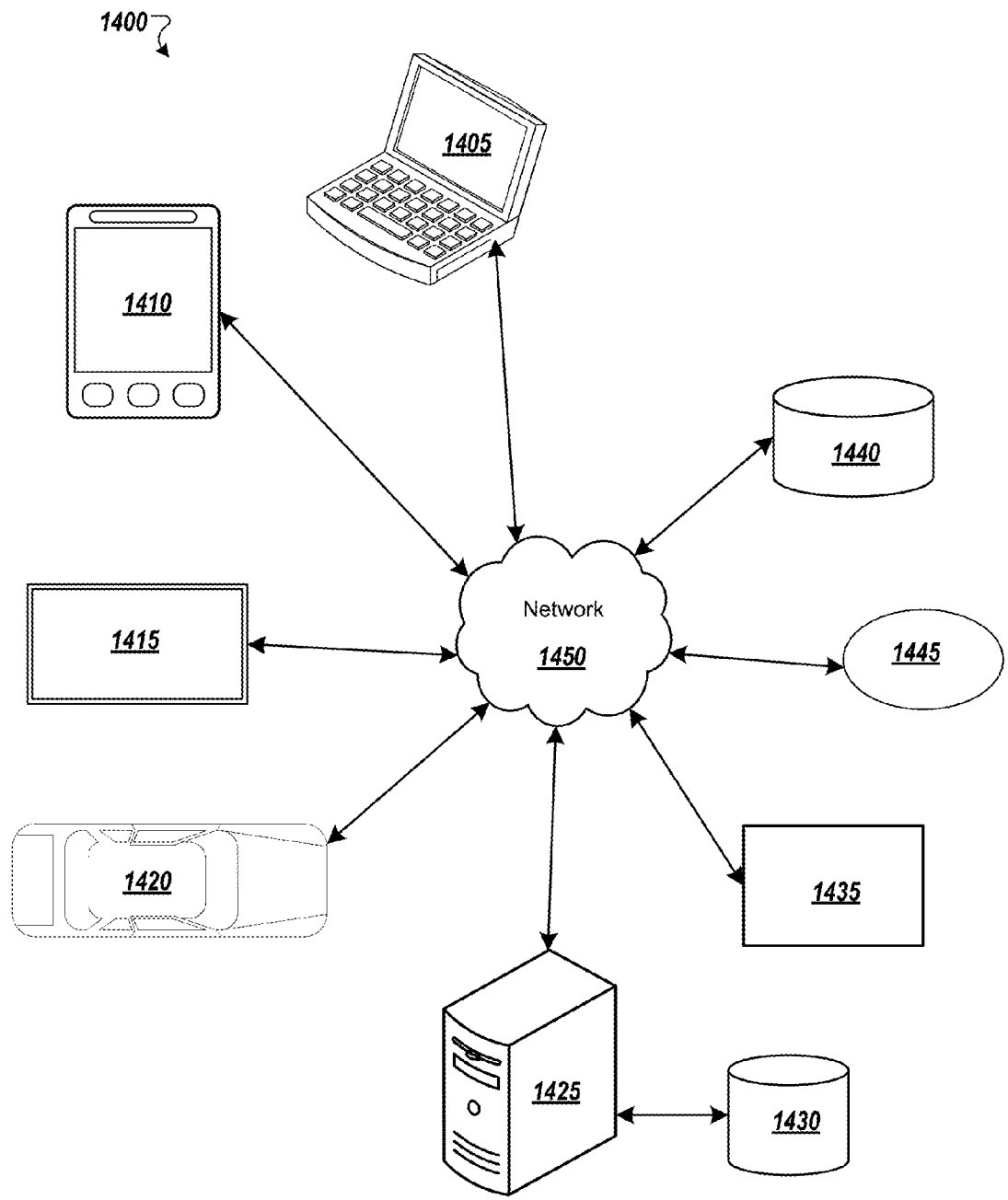
FIG. 14 shows an example environment suitable for some example implementations.

FIG. 14 shows an example environment suitable for some example implementations. Environment 1400 includes devices 1405-1445, and each is communicatively connected to at least one other device via, for example, network 1460 (e.g., by wireline and/or wireless connections). Some devices may be communicatively connected to one or more storage devices 1430 and 1445.

An example of one or more devices 1405-1445 may be a terminal device 10 described above in FIG. 12 or a server device 15 described above in FIG. 13. The one or more devices 1405-1445 may also be a third-party device 20, which can be embodied as a terminal device 10 or a server device 15. Devices 1405-1440 may include, but are not limited to, a computer 1405 (e.g., a laptop computing device), a mobile device 1410 (e.g., smartphone or tablet), a television 1415, a device associated with a vehicle 1420, a server computer 1425, other computing devices 1435, storage devices 1430 and 1440. The device 1445 may also include dedicated sensors or beacons, such as a Bluetooth beacon. Such device 1445 may not independently perform any computing, but may suggests a setting, desire, or option selected by a user to other devices 1405-1440 connected to the network 1450 by the device 1445 being present in a general vicinity of the other devices.

In some example implementations, devices 1405-1420 may be considered user devices (e.g., devices used by users to access services and/or issue requests, such as on a social network). Devices 1425-1445 may be devices associated with service providers (e.g., used by service providers to provide services and/or store data, such as webpages, text, text portions, images, image portions, audios, audio segments, videos, video segments, and/or information thereabout).

For example, a user (e.g., Alice) may obtain, and/or share content or a webpage using user device 1405 or 1410 on a social network supported by one or more devices 1425-1445. A recipient (e.g., Bob) may access and/or view Alice's shared content using device 1415 or 1420. Further, a subject (e.g., Sarah) obtained in the content may specify privacy settings for the shared content and based on the privacy settings specified by Sarah may cause the content to be automatically obfuscated prior and/or after sharing.

Example Implementation: Working Example

Figure 15:
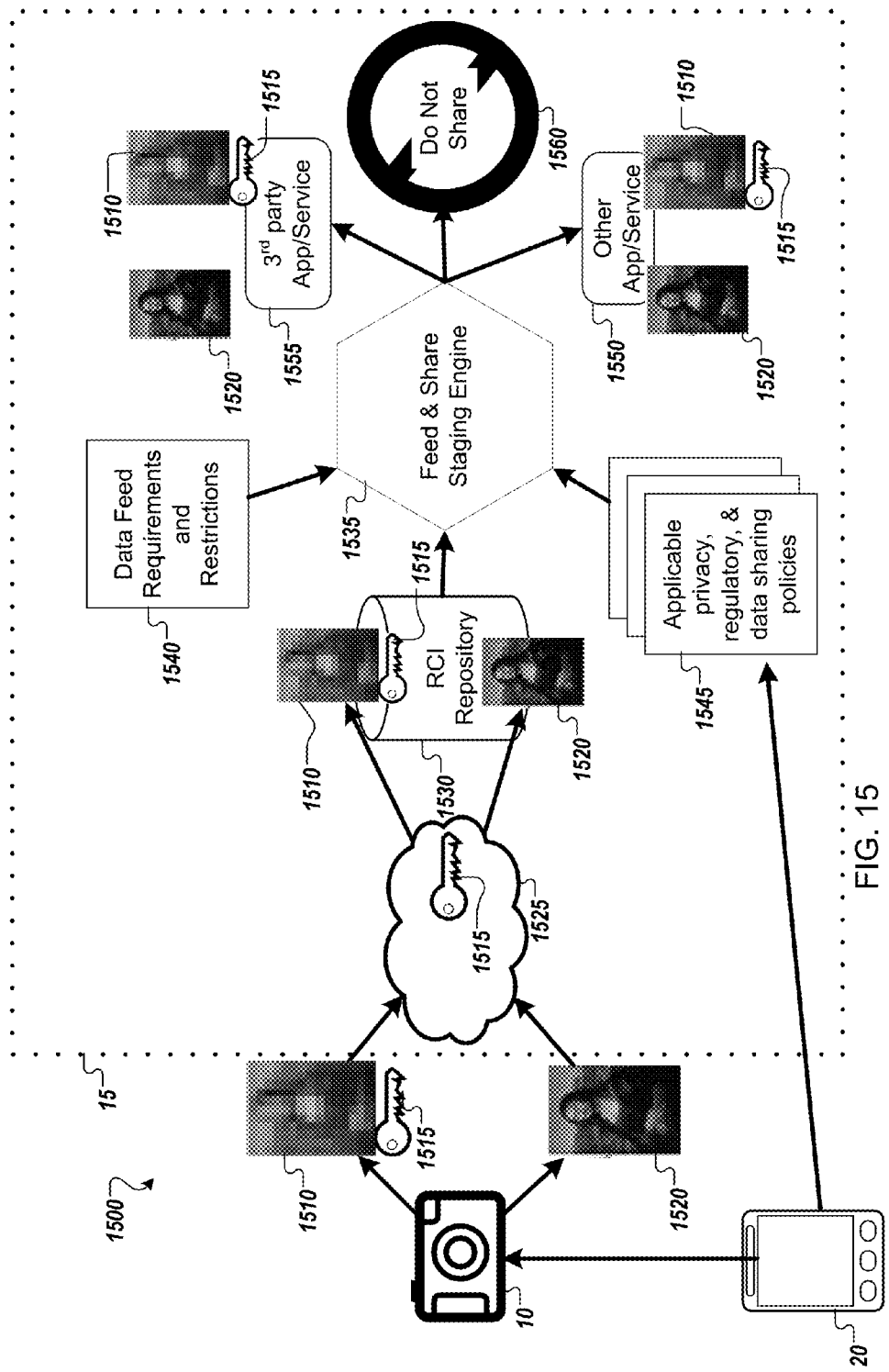
FIG. 15 illustrates a case of at least example implementation.

FIG. 15 illustrates a working example 1500 of one or more example implementations. In this use case 1500, a terminal device 10 obtains content containing one or more subjects. Based on information stored internally, or received from a third party device 20, or another computing device such as the server device 15, the terminal device 10 may obfuscate the obtained content to produce obfuscated content 1510 and an encryption key 1515. The information stored internally may be privacy settings, device information, location information, or any other information that could be used to identify a subject of the content and/or determine a need to restrict the accessibility of the content.

Once produced, the obfuscated content 1510 and encryption key 1515 may be sent via a network to the server device 15. Further, the terminal device 10 may also produce un-obfuscated content 1520 and send the un-obfuscated content 1520 to the server device 15 through the network 1525.

The server 15 may store the obfuscated content 1510, encryption key 1515, and un-obfuscated content 1520 to a content repository for storage. The content repository may be communicatively coupled to a feed and share staging engine 1535. The feed and share staging engine 1535 may regularly receive control settings associated with data feed requirements and restrictions 1540. The feed and share staging engine 1535 may also regularly receive privacy, regulatory, and data sharing policies 1545 from users, and other entities through third party devices 20.

Based on the data feed requirements and restrictions 1540 and privacy, regulatory, and data sharing policies 1545, the feed and share staging engine 1535 may send either the un-obfuscated content 1520 or the obfuscated content to other apps or services associated with the server device 10 at 1550. For example, if a user has specified that his or her image may be shared in un-obfuscated format to a social media service associated with the server device 15, the feed and share staging engine 1535 would provide the un-obfuscated content 1520 to the social media service at 1550. Conversely, if a user has specified his or her image may not be shared in un-obfuscated format to a social media service associated with the server device 15, the feed and share staging engine 1535 would provide the obfuscated content 1510 to the social media service at 1550.

Further, the feed and share staging engine 1535 may also provide the encryption key 1515 to other apps or services associated with the server device 10 at 1550 based on the data feed requirements and restrictions 1540 and privacy, regulatory, and data sharing policies 1545. For example, if a user has specified certain members of a social media service be allowed to access (e.g., view, hear or otherwise access in a manner that permits receiving comprehension of the content) the obfuscated content in an un-obfuscated form, the feed and share staging engine 1535 would provide the obfuscated content 1510 to the social media service and provide the encryption key 1515 to the specified members of the social media service at 1550.

When providing the encryption key 1515, the encryption key 1515 may be configured to not be transferrable, or only be transferrable a specified number of times to limit the recipient's ability to share the un-obfuscated content. Similarly, the encryption key 1515 may be configured to self-delete or self-destruct after a specified period of time to limit the recipient's ability to access (e.g., view, hear or otherwise access in a manner that permits receiving comprehension of the content) the un-obfuscated content.

Additionally, based on the data feed requirements and restrictions 1540 and privacy, regulatory, and data sharing policies 1545, the feed and share staging engine 1535 may send either the un-obfuscated content 1520 or the obfuscated content to third-party apps or services not associated with the server device 10 at 1555. If a user has specified that his or her image may be shared in un-obfuscated format to a social media service not associated with the server device 15, the feed and share staging engine 1535 would provide the un-obfuscated content 1520 to the social media service at 1555. Conversely, if a user has specified his or her image may not be shared in un-obfuscated format to a social media service not associated with the server device 15, the feed and share staging engine 1535 would provide the obfuscated content 1510 to the social media service at 1555.

Further, the feed and share staging engine 1535 may also provide the encryption key 1515 to third-party apps or services associated with the server device 10 at 1555 based on the data feed requirements and restrictions 1540 and privacy, regulatory, and data sharing policies 1545. For example, if a user has specified certain members of a social media service be allowed to access (e.g., view, hear or otherwise access in a manner that permits receiving comprehension of the content) the obfuscated content in an un-obfuscated form, the feed and share staging engine 1535 would provide the obfuscated content 1510 to the social media service and provide the encryption key 1515 to the specified members of the social media service at 1555.

When providing the encryption key 1515, the encryption key 1515 may be configured to not be transferrable, or only be transferrable a specified number of times to limit the recipient's ability to share the un-obfuscated content. Similarly, the encryption key 1515 may be configured to self-delete or self-destruct after a specified period of time to limit the recipient's ability to access (e.g., view, hear or otherwise access in a manner that permits receiving comprehension of the content) the un-obfuscated content.

Additionally, based on the data feed requirements and restrictions 1540 and privacy, regulatory, and data sharing policies 1545, the feed and share staging engine 1535 may not share the content in either the un-obfuscated content 1520 or the obfuscated content to any apps or services at 1560. In other words, the feed and share staging engine 1535 may not permit the content received by the server device 15 to be shared with any application, service of user.

In situations in which the systems discussed herein collect, when authorized by the user, personal information about users, or may make use of personal information, when authorized by the user, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed.

For example, depending on a preference of the user, a user's identity may be treated so that no personally identifiable information can be determined for the user, or a user's geographic location may be generalized where location information is obtained (such as to a city, ZIP code, or state level), so that a particular location of a user cannot be determined. Thus, the user may control how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method for managing privacy of shared content, the method comprising:
   receiving, at a computing device, content that has been previously been captured, the content containing a representation of an object;
   receiving, by the computing device, privacy settings associated with the representation of the object contained in the received content;
   based on the received privacy settings, obfuscating, by the computing device, at least a portion of the content containing the representation of the object to generate obfuscated content from the content by:
   partitioning the received content into a plurality of layers, the plurality of layers having two or more levels of fidelity;
   identifying a layer of the plurality of layers corresponding to a highest level of fidelity;
   generating an encryption key for the identified layer associated with the highest level of fidelity;
   encrypting the identified layer with the generated encryption key; and
   combining the encrypted identified layer with a remainder of the plurality of layers to generate the obfuscated content; and
   transmitting, by the computing device, the obfuscated content to a publishing server, wherein the publishing server publishes the obfuscated content to one or more third parties.

2. The method of claim 1, wherein the receiving the privacy settings comprises receiving the privacy settings from a second computing device located proximate to the computing device during the receiving of the content.

3. The method of claim 1, further comprising transmitting the encryption key to one or more third parties based on the privacy settings of the object of the received content.

4. The method of claim 3, wherein the transmitting the encryption key comprises configuring the encryption key based on the privacy settings of the object of the received content, wherein the encryption key is configured to have a characteristic modified based on at least one of an elapsed time; or an attempt to transfer the encryption key by the one or more third parties.

5. The method of claim 1, wherein the encrypting the identified layer further comprises configuring the encryption to weaken based on elapsed time based on the privacy settings of the object of the received content.

6. The method of claim 1, wherein the obfuscation is performed in real-time when the content is obtained and prior to the content being stored.

7. The method of claim 1, wherein the one or more third parties comprises at least one user having an online account that does not control the computing device or the publishing server.

8. A method for managing privacy of shared content, the method comprising:
   receiving, at a computing device, content previously captured, the content containing a representation of an object;
   receiving, by the computing device, an identification that identifies the representation of the object contained in the received content;
   determining, by the computing device, privacy settings associated with the identified representation of the object based on a database stored on the computing device;
   based on the determined privacy settings, obfuscating, by the computing device, at least a portion of the content containing the representation of the object to generate obfuscated content from the received content by:
      partitioning the received content into a plurality of layers, the plurality of layers having two or more levels of fidelity;
      identifying a layer of the plurality of layers corresponding to a highest level of fidelity;
      generating an encryption key for the identified layer associated with the highest level of fidelity;
      encrypting the identified layer with the generated encryption key; and
      combining the encrypted identified layer with a remainder of the plurality of layers to generate the obfuscated content; and
   transmitting, by the computing device, the obfuscated content to a publishing server, wherein the publishing server publishes the obfuscated content to one or more third parties.

9. The method of claim 8, wherein the receiving the identification comprises receiving the identification from a second computing device located proximate to the computing device during the receiving of the content.

10. The method of claim 8, further comprising transmitting the encryption key to one or more third parties based on the privacy settings of the object of the received content.

11. The method of claim 10, wherein the transmitting the encryption key comprises configuring the encryption key based on the privacy settings of the object of the received content, wherein the encryption key is configured to have a characteristic modified based on at least one of: an elapsed time, or an attempt to transfer the encryption key by the one or more third parties.

12. The method of claim 8, wherein the encrypting the identified layer further comprises configuring the encryption to weaken based on elapsed time based on the privacy settings of the object of the received content.

13. A method for managing privacy of shared content, the method comprising:
   receiving, by a computing device, content containing a representation of an object;
   extracting, by the computing device, object features from the content, the object features being associated with the representation of the object of the content;
   identifying, by the computing device, the object of the content based on the extracted object features;
   determining, by the computing device, privacy settings associated with the identified object based on a database stored on the computing device, the privacy settings comprising one or more rules specifying a condition;
   based on the one or more rules and the specified condition, obfuscating, by the computing device, at least a portion of the content containing the representation of the object to generate obfuscated content by:
      partitioning the received content into a plurality of layers, the plurality of layers having two or more levels of fidelity;
      identifying a layer of the plurality of layers corresponding to a highest level of fidelity;
      generating an encryption key for the identified layer associated with the highest level of fidelity;
      encrypting the identified layer with the generated encryption key; and
      combining the encrypted identified layer with a remainder of the plurality of layers to generate the obfuscated content; and
   transmitting, by the computing device, the obfuscated content to a publishing server, wherein the publishing server publishes the obfuscated content to one or more third parties.

14. The method of claim 13, further comprising transmitting the encryption key to one or more third parties based on the privacy settings of the object of the received content.

15. The method of claim 14, wherein the transmitting the encryption key comprises configuring the encryption key based on the privacy settings of the object of the received content, wherein the encryption key is configured to have a characteristic modified based on at least one of: an elapsed time; or an attempt to transfer the encryption key by the one or more third parties.

16. The method of claim 13, wherein the encrypting the identified layer further comprises configuring the encryption to weaken based on elapsed time based on the privacy settings of the object of the received content.

17. A non-transitory computer readable medium having stored therein computer executable instructions for:
   receiving content that contains a representation of an object;
   receiving privacy settings associated with the representation of the object contained in the received content, the privacy settings comprising one or more rules specifying a condition;
   based on the one or more rules and the specified condition, obfuscating at least a portion of the content containing the representation of the object to generate obfuscated content by:
      partitioning the received content into a plurality of layers, the plurality of layers having two or more levels of fidelity;
      identifying a layer of the plurality of layers corresponding to a highest level of fidelity;
      generating an encryption key for the identified layer associated with the highest level of fidelity;
      encrypting the identified layer with the generated encryption key; and combining the encrypted identified layer with a remainder of the plurality of layers to generate the obfuscated content; and transmitting the obfuscated content to a publishing server, wherein the publishing server publishes the obfuscated content to one or more third parties.

18. A non-transitory computer readable medium having stored therein computer executable instructions for:

receiving content that has previously been captured and that contains a representation of an object;

receiving an identification that identifies the representation of the object contained in the received content;

determining privacy settings associated with the identified object based on database stored on a computing device, the privacy settings comprising one or more rules specifying a condition;

based on the one or more rules and the specified condition, obfuscating at least a portion of the content that contains the representation of the object to generate obfuscated content from the content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and transmitting the obfuscated content to a publishing server, wherein the publishing server publishes the obfuscated content to one or more third parties.

19. A non-transitory computer readable medium having stored therein computer executable instructions for:

receiving content that has previously been captured and that contains a representation of an object;

extracting object features from the content, the object features being associated with the representation of the object of the content;

identifying the object of the content based on the extracted object features;

determining privacy settings associated with the identified object based on a database stored on a computing device, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and transmitting the obfuscated content to a publishing server, wherein the publishing server publishes the obfuscated content to one or more third parties.

20. At least one computing device comprising storage and a processor configured to perform:

receiving content that has been previously been captured, the content containing a representation of an object;

receiving privacy settings associated with the representation of the object contained in the received content;

based on the received privacy settings, obfuscating at least a portion of the content that contains the representation of the object to generate obfuscated content from the content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and transmitting the obfuscated content to a publishing server, wherein the publishing server publishes the obfuscated content to one or more third parties.

21. At least one computing device comprising storage and a processor configured to perform:

receiving content that has been previously been captured, the content containing a representation of an object;

receiving an identification that identifies the representation of the object contained in the received content;

determining privacy settings associated with the identified object based on database stored on the computing device;

based on the determined privacy settings, obfuscating at least a portion of the content that contains the representation of the object to generate obfuscated content from the content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and transmitting the obfuscated content to a publishing server, wherein the publishing server publishes the obfuscated content to one or more third parties.

22. At least one computing device comprising storage and a processor configured to perform:

receiving content that has been previously been captured, the content containing a representation of an object;

extracting object features from the content, the object features being associated with the representation of the object of the content;

identifying the object of the content based on the extracted object features;

determining privacy settings associated with the identified object based on a database stored on the computing device;

based on the determined privacy settings, obfuscating at least a portion of the content that contains the representation of the object to generate obfuscated content from the content by:
  partitioning the received content into a plurality of layers, the plurality of layers having two or more levels of fidelity;
  identifying a layer of the plurality of layers corresponding to a highest level of fidelity;
  generating an encryption key for the identified layer associated with the highest level of fidelity;
  encrypting the identified layer with the generated encryption key; and
  combining the encrypted identified layer with a remainder of the plurality of layers to generate the obfuscated content; and
transmitting the obfuscated content to a publishing server, wherein the publishing server publishes the obfuscated content to one or more third parties.

23. A method for managing privacy of shared content, the method comprising:
  receiving, at a computing device, previously captured content that contains a representation of an object;
  receiving, by the computing device, privacy settings associated with the representation of the object contained in the received content, the privacy settings comprising one or more rules specifying a condition;
  based on the one or more rules and the specified condition, obfuscating, by the computing device, at least a portion of the content that contains the representation of the object to generate obfuscated content by:
    partitioning the received content into a plurality of layers, the plurality of layers having two or more levels of fidelity;
    identifying a layer of the plurality of layers corresponding to a highest level of fidelity;
    generating an encryption key for the identified layer associated with the highest level of fidelity;
    encrypting the identified layer with the generated encryption key; and
    combining the encrypted identified layer with a remainder of the plurality of layers to generate the obfuscated content; and
  publishing, by the computing device, the obfuscated content to one or more third parties.

24. The method of claim 23, wherein the receiving the privacy settings comprises receiving the privacy settings from a second computing device located proximate to the object during the receiving of the content.

25. The method of claim 23, further comprising transmitting the encryption key to one or more third parties based on the privacy settings of the object of the received content.

26. The method of claim 25, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

27. The method of claim 23, wherein the encrypting the identified layer further comprises configuring the encryption to weaken based on elapsed time based on the privacy settings of the object of the received content.

28. A method for managing privacy of shared content, the method comprising:
  receiving, at a computing device, previously captured content that contains a representation of an object;
  receiving, by the computing device, an identification identifying the representation of the object contained in the received content;
  determining, by the computing device, privacy settings associated with the identified object based on database stored on the computing device, the privacy settings comprising one or more rules specifying a condition;
  based on the one or more rules and specified conditions, obfuscating, by the computing device, at least a portion of the content that contains the representation of the object to generate obfuscated content by:
    partitioning the received content into a plurality of layers, the plurality of layers having two or more levels of fidelity;
    identifying a layer of the plurality of layers corresponding to a highest level of fidelity;
    generating an encryption key for the identified layer associated with the highest level of fidelity;
    encrypting the identified layer with the generated encryption key; and
    combining the encrypted identified layer with a remainder of the plurality of layers to generate the obfuscated content; and
  publishing, by the computing device, the obfuscated content to one or more third parties.

29. The method of claim 28, wherein the receiving the identification comprises receiving the identification from a second computing device located proximate to the object during the receiving of the content.

30. The method of claim 28, further comprising transmitting the encryption key to one or more third parties based on the privacy settings of the object of the received content.

31. The method of claim 30, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

32. The method of claim 28, wherein the encrypting the identified layer further comprises configuring the encryption to weaken based on elapsed time based on the privacy settings of the object of the received content.

33. A method for managing privacy of shared content, the method comprising:
  receiving, at a computing device, previously captured content that contains a representation of an object;
  extracting, by the computing device, object features from the content, the object features being associated with the representation of the object of the content;
  identifying, by the computing device, the object of the content based on the extracted object features;
  determining, by the computing device, privacy settings associated with the identified object based on a database stored on the computing device, the privacy settings comprising one or more rules specifying a condition;
  based on the one or more rules and the specified condition, obfuscating, by the computing device, at least a portion of the content that contains the representation of the object to generate obfuscated content by:
    partitioning the received content into a plurality of layers, the plurality of layers having two or more levels of fidelity;
    identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing, by the computing device, the obfuscated content to one or more third parties.

34. The method of claim 33, further comprising transmitting the encryption key to one or more third parties based on the privacy settings of the object of the received content.

35. The method of claim 34, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

36. The method of claim 33, wherein the encrypting the identified layer further comprises configuring the encryption to weaken based on elapsed time based on the privacy settings of the object of the received content.

37. A non-transitory computer readable medium having stored therein computer executable instructions for:

receiving previously captured content that contains a representation of an object;

receiving privacy settings associated with the representation of the object contained in the received content, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

38. A non-transitory computer readable medium having stored therein computer executable instructions for:

receiving previously captured content that contains a representation of an object;

receiving an identification identifying the representation of the object contained in the received content;

determining privacy settings associated with the identified object based on a database, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

39. A non-transitory computer readable medium having stored therein computer executable instructions for:

receiving previously captured content that contains a representation of an object;

extracting object features from the content, the object features being associated with the representation of the object of the content;

identifying the object of the content based on the extracted object features;

determining privacy settings associated with the identified object based on a database, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

40. At least one computing device comprising storage and a processor configured to perform:

receiving previously captured content that contains a representation of an object;

receiving privacy settings associated with the representation of the object contained in the received content, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

41. At least one computing device comprising storage and a processor configured to perform:

receiving previously captured content that contains a representation of an object;

receiving an identification identifying the representation of the object contained in the received content;

determining privacy settings associated with the identified object based on database stored on the computing device, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

42. At least one computing device comprising storage and a processor configured to perform:

receiving previously captured content that contains a representation of an object;

extracting object features from the content, the object features being associated with the representation of the object of the content;

identifying the object of the content based on the extracted object features;

determining privacy settings associated with the identified object based on a database, the privacy settings comprising one or more rules specifying a condition;

based on the one or more rules and the specified condition, obfuscating at least a portion of the content that contains the representation of the object to generate obfuscated content by:

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer with the generated encryption key; and combining the encrypted identified layer with a remainder of the plurality of layers to generate the obfuscated content; and publishing the obfuscated content to one or more third parties.

43. A method for distributing received content, the method comprising:

receiving, at a computing device, previously captured content that contains a representation of an object;

partitioning, by the computing device, the received content into a plurality of layers, the plurality of layers having two or more levels of fidelity;

identifying, by the computing device, a layer of the plurality of layers corresponding to a highest level of fidelity;

generating, by the computing device, an encryption key for the identified layer associated with the highest level of fidelity;

encrypting, by the computing device, the identified layer using the generated encryption key;

combining, by the computing device, the encrypted identified layer with a remainder of the plurality of layers to generate obfuscated content; and transmitting, by the computing device, the obfuscated content to a publishing server for publishing to one or more third parties.

44. The method of claim 43, further comprising transmitting the encryption key to one or more third parties based on privacy settings of the object of the received content.

45. The method of claim 44, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

46. The method of claim 43, wherein the encrypting the identified layer further comprises configuring the encryption to weaken based on elapsed time based on privacy settings of the object of the received content.

47. A method for distributing received content, the method comprising:

receiving, at a computing device, previously captured content that contains a representation of an object;

partitioning, by the computing device, the received content into a plurality of layers, the plurality of layers having two or more levels of fidelity;

identifying, by the computing device, a layer of the plurality of layers corresponding to a highest level of fidelity;

generating, by the computing device, an encryption key for the identified layer associated with the highest level of fidelity;

encrypting, by the computing device, the identified layer using the generated encryption key;

combining, by the computing device, the encrypted identified layer with a remainder of the plurality of layers to generate obfuscated content; and publishing, by the computing device, the obfuscated content to one or more third parties.

48. The method of claim 47, further comprising transmitting the encryption key to one or more third parties based on privacy settings of the object of the received content.

49. The method of claim 48, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

50. The method of claim 47, wherein the encrypting the identified layer further comprises configuring the encryption to weaken based on elapsed time based on privacy settings of the object of the received content.

51. A non-transitory computer readable medium having stored therein computer executable instructions for:

receiving previously captured content that contains a representation of an object;

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer using the generated encryption key;

combining the encrypted identified layer with a remainder of the plurality of layers to generate obfuscated content; and transmitting the obfuscated content to a publishing server for publishing to one or more third parties.

52. The non-transitory computer readable medium of claim 51, further comprising transmitting the encryption key to one or more third parties based on privacy settings of the object of the received content.

53. The non-transitory computer readable medium of claim 52, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

54. The non-transitory computer readable medium of claim 51, wherein the encrypting the identified layer further comprises configuring the encryption to weaken based on elapsed time based on privacy settings of the object of the received content.

55. A non-transitory computer readable medium having stored therein computer executable instructions for:

receiving previously captured content that contains a representation of an object;

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer using the generated encryption key;

combining the encrypted identified layer with a remainder of the plurality of layers to generate obfuscated content; and publishing the obfuscated content to one or more third parties.

56. The non-transitory computer readable medium of claim 55, further comprising transmitting the encryption key to one or more third parties based on privacy settings of the object of the received content.

57. The non-transitory computer readable medium of claim 56, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

58. The non-transitory computer readable medium of claim 55, wherein the encrypting the identified layer further comprises configuring the encryption to weaken based on elapsed time based on privacy settings of the object of the received content.

59. At least one computing device comprising storage and a processor configured to perform:

receiving previously captured content that contains a representation of an object;

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer using the generated encryption key;

combining the encrypted identified layer with a remainder of the plurality of layers to generate obfuscated content; and transmitting the obfuscated content to a publishing server for publishing to one or more third parties.

60. The at least one computing device of claim 59, further comprising transmitting the encryption key to one or more third parties based on privacy settings of the object of the received content.

61. The at least one computing device of claim 60, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

62. The at least one computing device of claim 59, wherein the encrypting the identified layer further comprises configuring the encryption to weaken based on elapsed time based on privacy settings of the object of the received content.

63. At least one computing device comprising storage and a processor configured to perform:

receiving previously captured content that contains a representation of an object;

partitioning the received content into a plurality of layers, the plurality of layers having two or more levels of fidelity;

identifying a layer of the plurality of layers corresponding to a highest level of fidelity;

generating an encryption key for the identified layer associated with the highest level of fidelity;

encrypting the identified layer using the generated encryption key;

combining the encrypted identified layer with a remainder of the plurality of layers to generate obfuscated content; and publishing the obfuscated content to one or more third parties.

64. The at least one computing device of claim 63, further comprising transmitting the encryption key to one or more third parties based on privacy settings of the object of the received content.

65. The at least one computing device of claim 64, wherein the transmitting the encryption key comprises configuring the encryption key based on the privacy settings of the object of the received content, wherein the encryption key is configured to be modified based on at least one of: an elapsed time; or an attempt to transfer the encryption key by the one or more third parties.

66. The at least one computing device of claim 63, wherein the encrypting the identified layer further comprises configuring the encryption to weaken based on elapsed time based on privacy settings of the object of the received content.

* * * * *